United States Patent [19]

Nozaki

[11] Patent Number: 5,626,082

[45] Date of Patent: May 6, 1997

[54] EMERGENCY BRAKING DEVICE FOR LINEAR MOTOR DRIVEN TRANSPORT SYSTEM

[75] Inventor: Takashi Nozaki, Ise, Japan

[73] Assignee: Shinko Electric Co., Ltd., Tokyo, Japan

[21] Appl. No.: 559,759

[22] Filed: Nov. 13, 1995

Related U.S. Application Data

[62] Division of Ser. No. 281,347, Jul. 27, 1994, Pat. No. 5,492,066.

[30] Foreign Application Priority Data

| Jul. 30, 1993 | [JP] | Japan | 5-206851 |
| Jul. 30, 1993 | [JP] | Japan | 5-206852 |
| Aug. 5, 1993 | [JP] | Japan | 5-212095 |
| Aug. 5, 1993 | [JP] | Japan | 5-212096 |
| Aug. 30, 1993 | [JP] | Japan | 5-235884 |
| Sep. 20, 1993 | [JP] | Japan | 5-255253 |
| Sep. 20, 1993 | [JP] | Japan | 5-255254 |

[51] Int. Cl.$^6$ ............................................. B61K 7/00
[52] U.S. Cl. ................................ 104/252; 104/250
[58] Field of Search ................................ 104/249, 250, 104/252, 290, 292, 89, 287, 288, 295, 172.3, 172.4; 188/38, 38.5, 41, 62, 33; 246/186, 187 R, 187 B, 182 A, 184

[56] References Cited

U.S. PATENT DOCUMENTS

| 1,827,162 | 10/1931 | Miller | 188/62 |
| 2,894,606 | 7/1959 | Bless | 188/62 |
| 4,545,303 | 10/1985 | Fujita et al. | 104/93 |
| 4,641,582 | 2/1987 | Uttscheid | 105/150 |
| 4,671,183 | 6/1987 | Fujita et al. | 104/93 |
| 4,819,564 | 4/1989 | Brandis et al. | 104/250 |
| 4,860,662 | 8/1989 | Matsumoto et al. | 104/290 |
| 4,905,605 | 3/1990 | Shishido et al. | 104/93 |
| 4,951,574 | 8/1990 | Tsuneda | 104/288 |
| 4,958,716 | 9/1990 | Matsuo et al. | |
| 5,116,002 | 5/1992 | Veraart | 104/292 |
| 5,277,125 | 1/1994 | DiFonso et al. | 104/292 |

FOREIGN PATENT DOCUMENTS

| 0213848 | 3/1987 | European Pat. Off. |
| 0400663 | 12/1990 | European Pat. Off. |

OTHER PUBLICATIONS

*Patent Abstracts of Japan*, vol. 12, No. 206 (M–708) 14 Jun. 1988 and JP–A–63 008 121 (Shinko Electric Co. Ltd.— abstract).

*Patent Abstracts of Japan*, vol. 14, No. 155 (M–0954) 26 Mar. 1990 (Shinko Electric Co. Ltd.).

*Primary Examiner*—Mark T. Le
*Attorney, Agent, or Firm*—Darby & Darby

[57] ABSTRACT

A linear motor driven transport system of an improved design is presented. The conventional roller configuration for holding the transport vehicle on the rail track has been replaced with a spring-loaded design so as to maintain the contact between the roller and the rail surface regardless of the curvatures in the routing track. Weighing device of an improved direct-loading design is adopted to improve the ruggedness of the device. Devices for controlling the positioning of the transport vehicle, including the carrier, have been simplified and the number of component pieces reduced to lower the cost of manufacturing the transport system. The container and track configurations have also been modified to enable efficient track set-up and loading/ unloading of goods in complex track routing in a limited space. The primary drive unit, the vehicle stopping device, the vehicle position detection device and the emergency braking unit provided only in the vertical section of the track are all placed on the side of the rail which faces the transport vehicle. This arrangement of the components on one side of the rail facilitates manufacturing, assembling and servicing of the components. The overall result is that not only the cost of manufacturing the system has been reduced, but also the overall transportation operation has been improved with minimal maintenance requirements so as to enable the application of the transport system in any facility requiring handling of a large number of goods and information, such as parts, medical charts, and documentations in factories, hospitals, libraries and other such organizations.

6 Claims, 29 Drawing Sheets

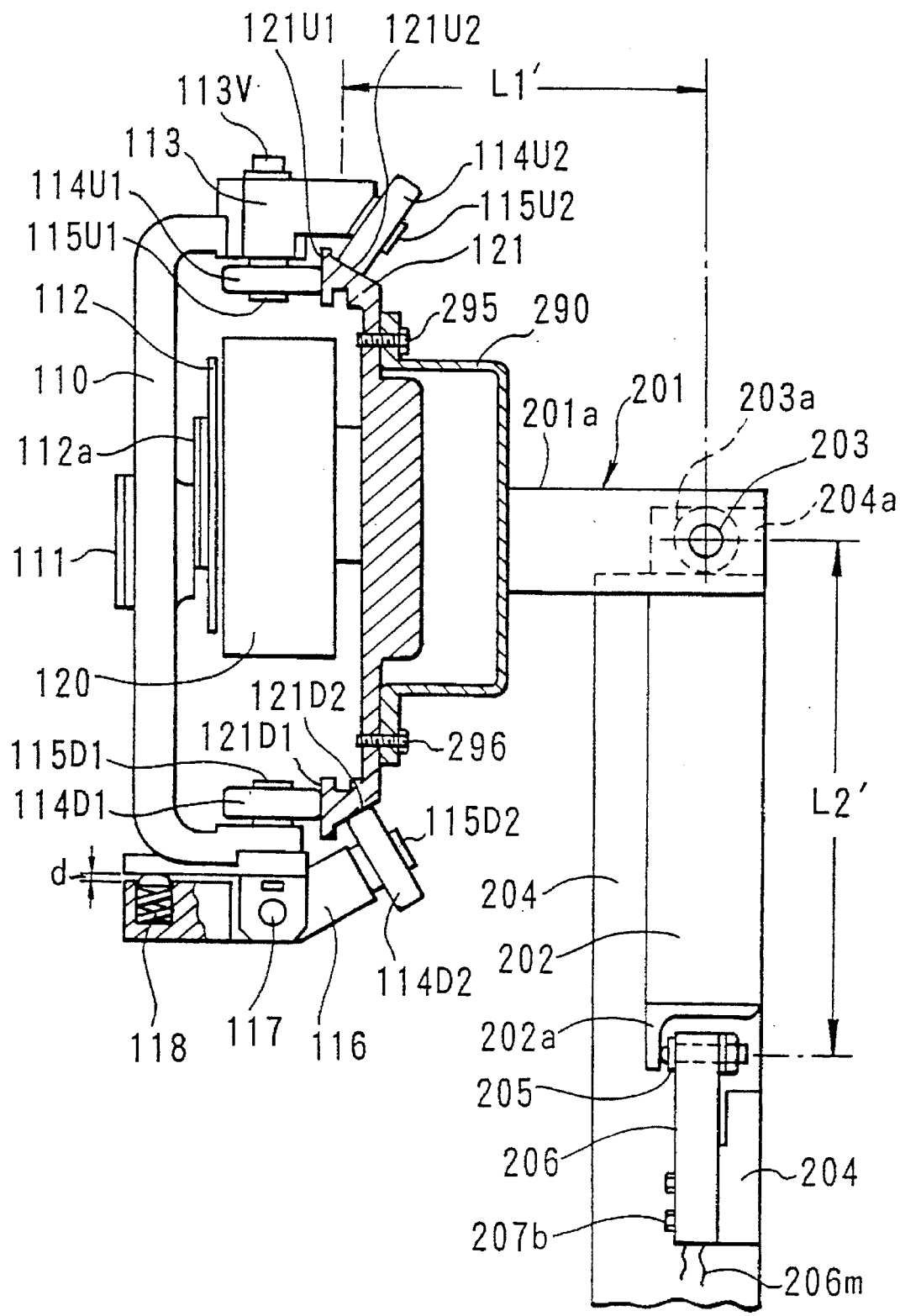

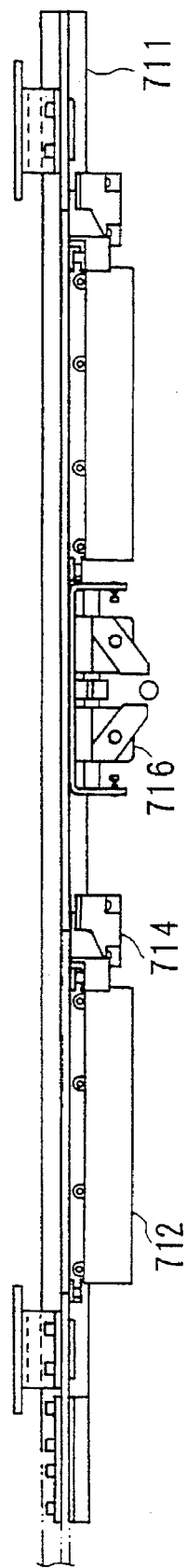
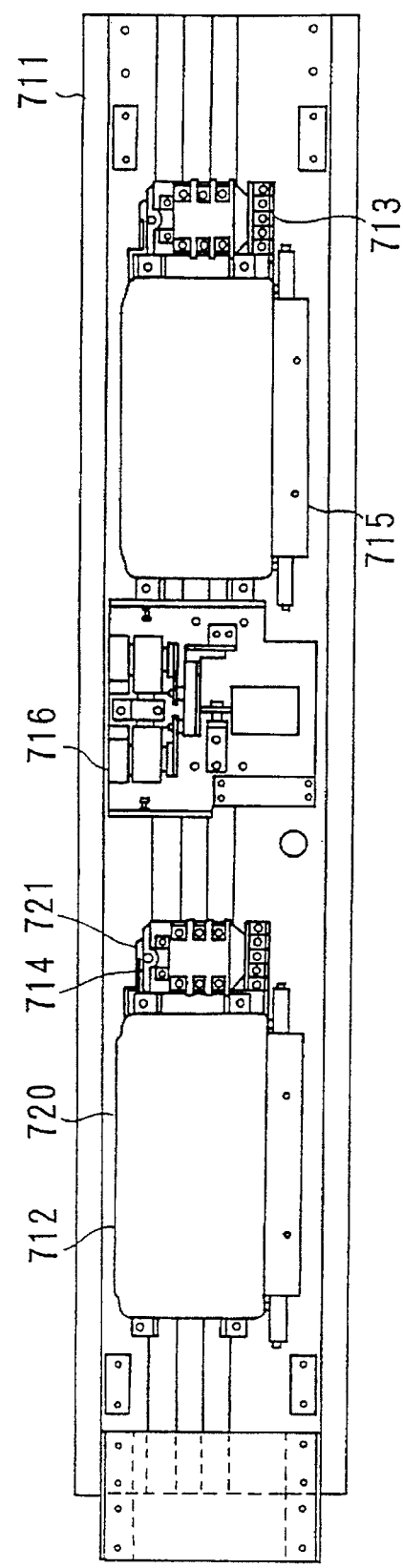
FIG. 21A
FIG. 21B

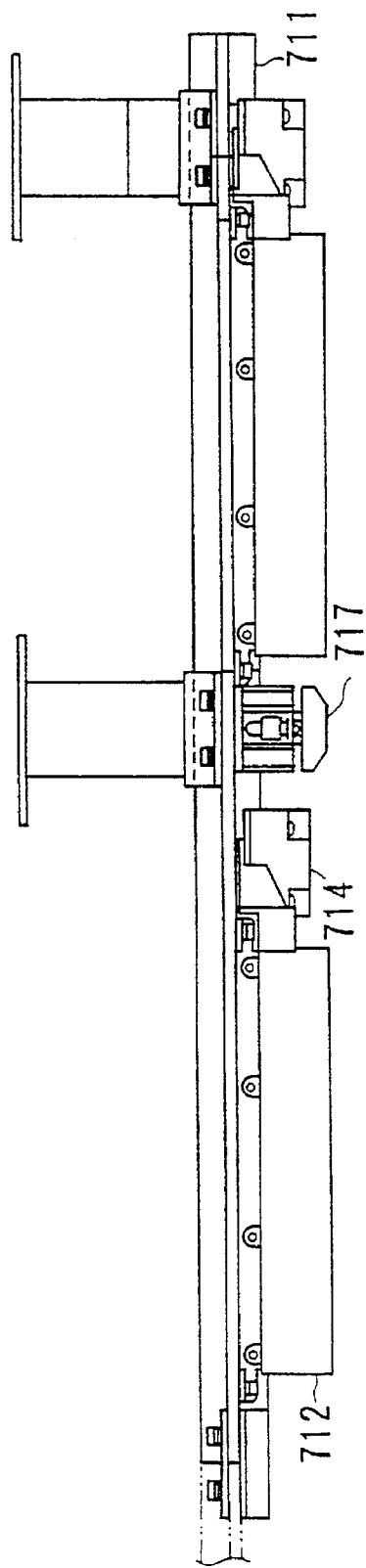
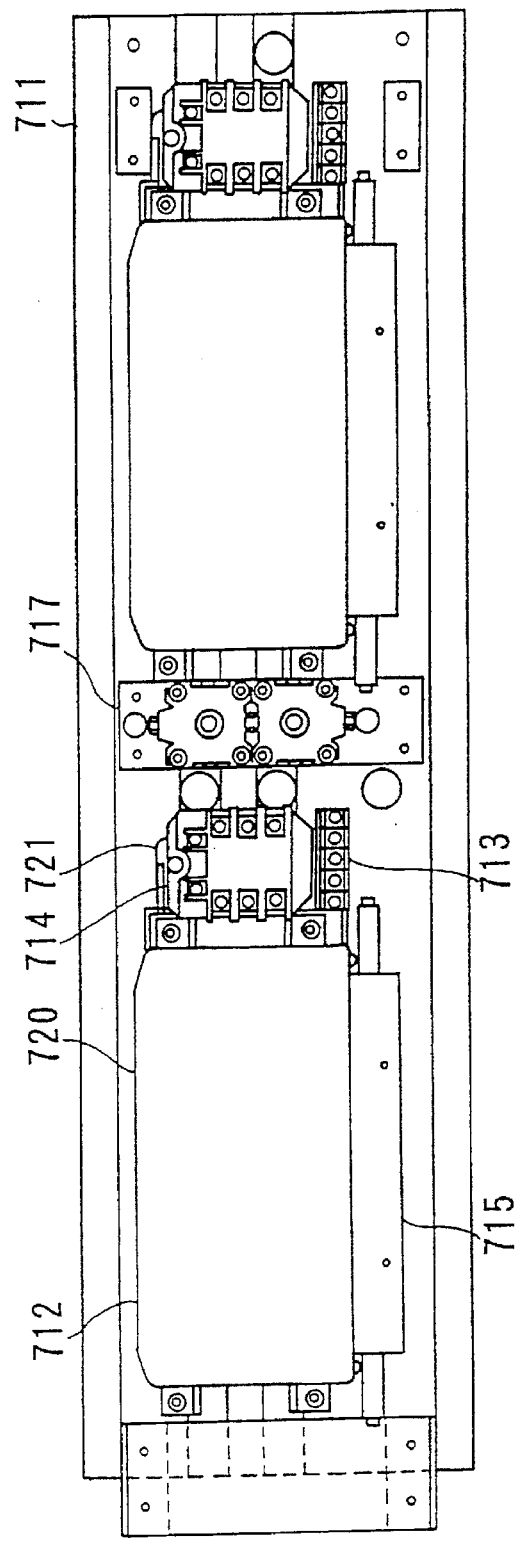
FIG. 22A
FIG. 22B

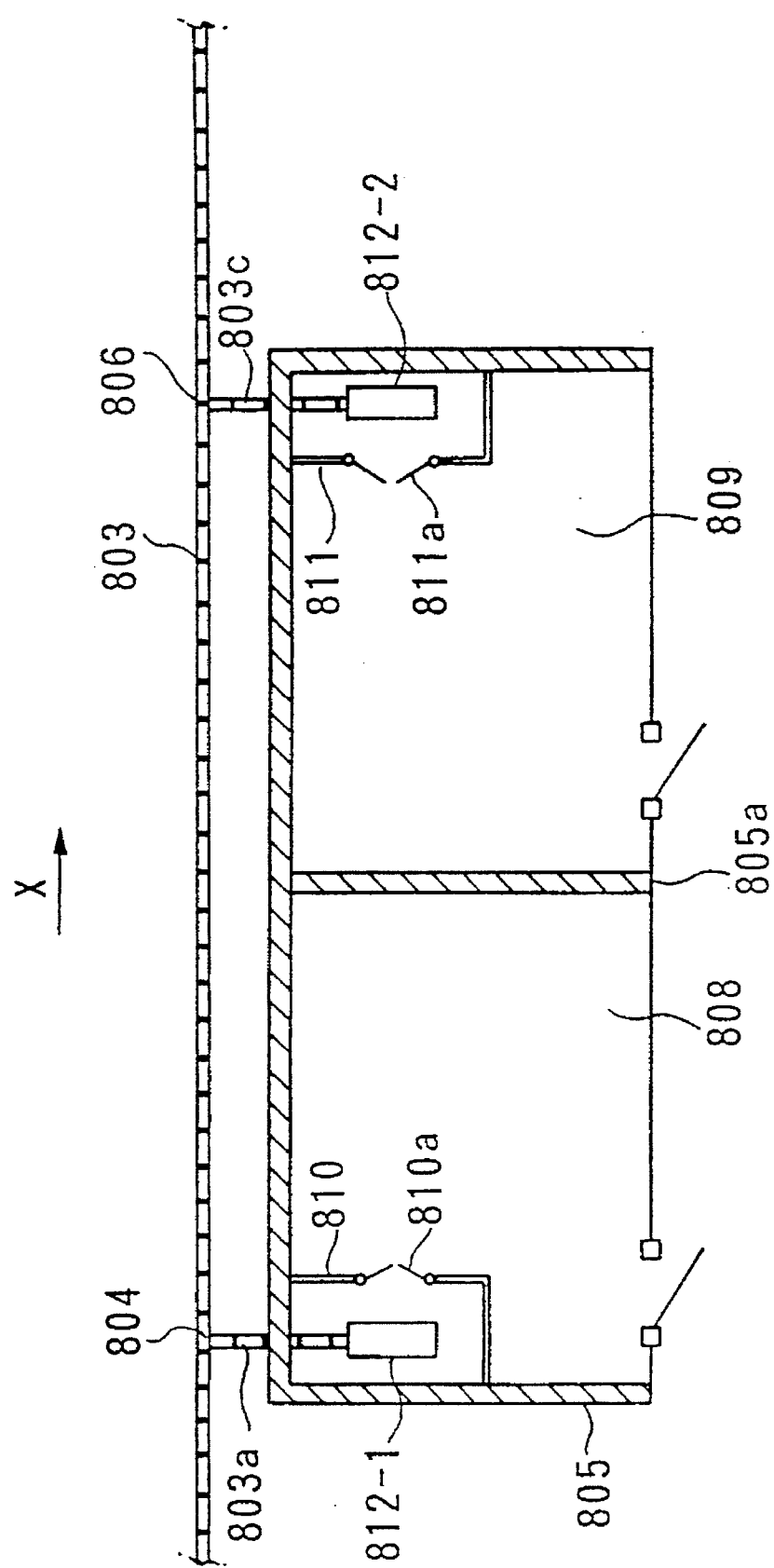

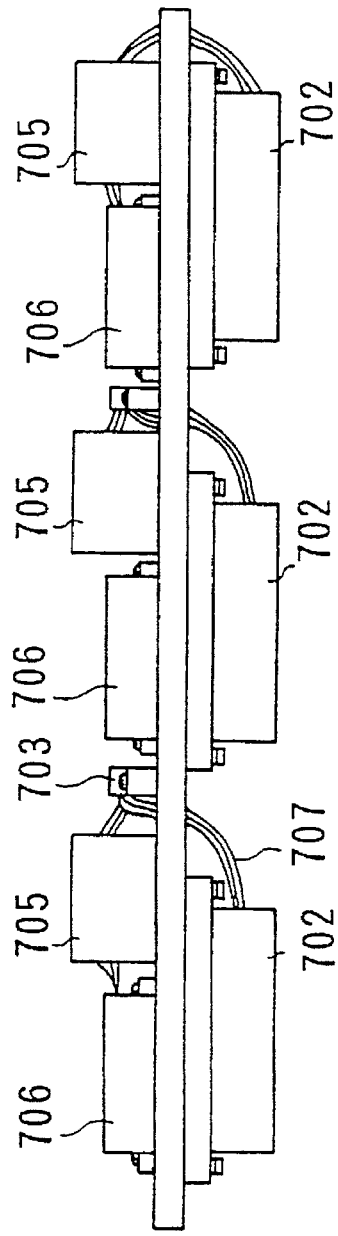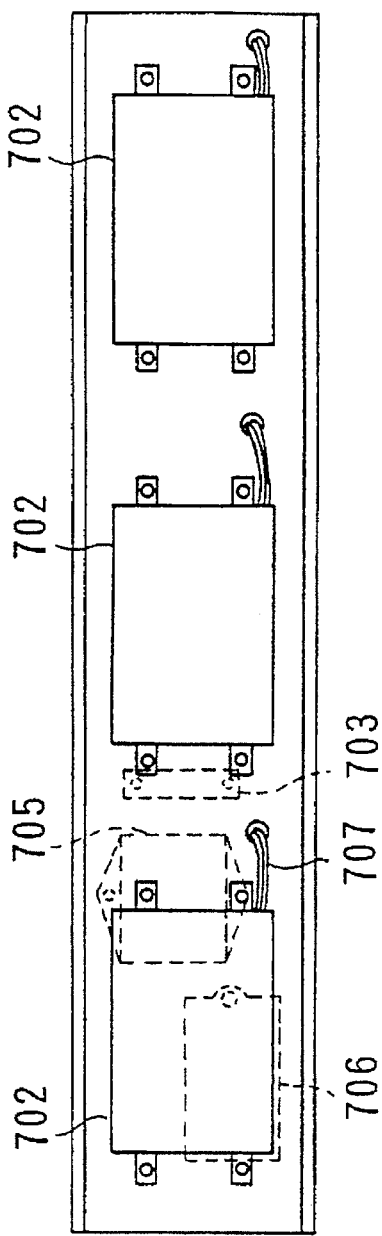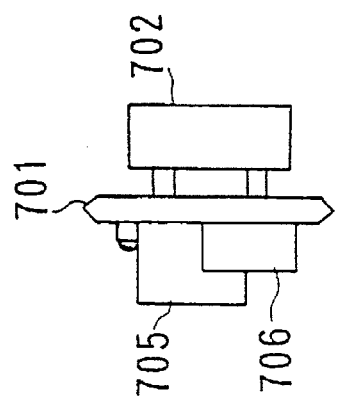
FIG. 45A (PRIOR ART)
FIG. 45B (PRIOR ART)
FIG. 45C (PRIOR ART)

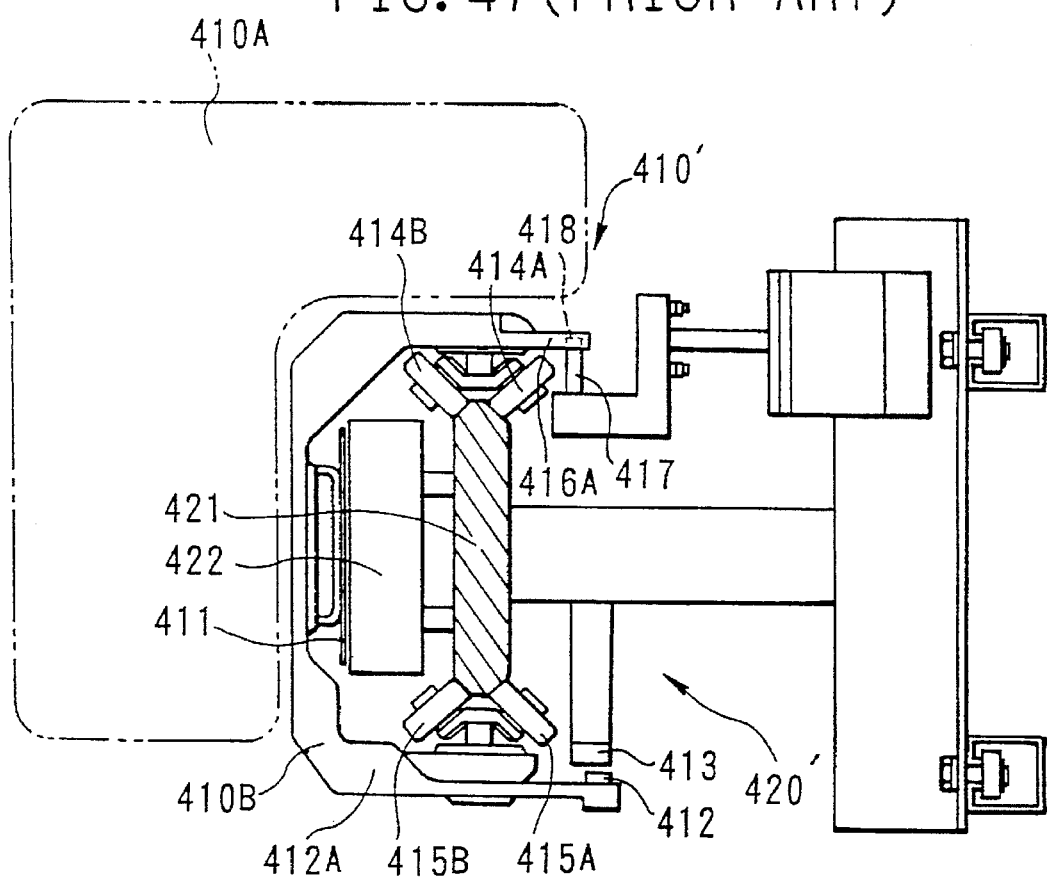

EMERGENCY BRAKING DEVICE FOR LINEAR MOTOR DRIVEN TRANSPORT SYSTEM

RELATD APPLICATIONS

This application is a division of U.S. application Ser. No. 08/281,347 filed Jul. 27, 1994, now U.S. Pat. No. 5,492,066, which is assigned to SHINKO ELECTRIC CO., LTD., the same assignee as in this application.

BACKGROUND OF THE INVENTION

1. Field of the Invention

The present invention relates in general to a transport system for transporting objects between stations, and relates in particular to improvements in the various active components of a linear motor driven transport system to achieve higher operational performance compared with that of conventional systems.

2. Technical Background

Whenever there is a need to transfer objects such as goods, materials and information in manufacturing lines, transporting of drugs and medical charts in hospitals, various transporting systems have been in use through the years. In these transporting systems, some key components of the system are assembled together to produce a unified transportation system. Some of the components of a conventional transporting system based on a linear motor drive will be explained in some detail in the following under respective headings.

The presentations are divided into eight component groups as follows:

(1) Transport drive, including transport vehicle, carrier and rail track configuration;
(2) Weighing device;
(3) Vehicle stopping device;
(4) Vehicle position detection device;
(5) Primary drive unit structure;
(6) Emergency braking device;
(7) Rail track structure;
(8) Container structure.

Each of the above components will be discussed sequentially in detail with illustrated examples from conventional systems.

(1) Transport drive

An example of a type of routing in a transport system applicable to the present invention is shown in FIG. 34.

In FIG. 34, a transport vehicle 101 controlled by a command and control device (not shown) runs along an fixed track 102 installed along a transport route. Hereinafter, various components used in the system are referred to as either on the immobile side or on the mobile side. In the following presentation, references are sometimes made to mobile or immobile side of the transport system. This reference is in relation to the two surface of the fixed track, i.e. the mobile side of the fixed track is the side facing the transport vehicle, and similarly the immovable side means the opposite side of the fixed rail.

In some transport systems, a vertical transport route is needed, such as the track 102V shown in FIG. 34, as well as a horizontal track 102H. Such a routing comprises an internally curving track 102C which joins the horizontal track 102H with the vertical track 102V, and an externally curving track 102C' which joins the vertical track 102V with the horizontal track 102H, respectively shown by curved arrows in FIG. 34. Although not shown in this figure, other track configurations, such as inclined tracks and curved tracks which bend within a horizontal plane, can also be provided depending on the need of the transport system.

In FIG. 35, the configurational relationship between the rail track 141 and the transport vehicle 101 driven by such a linear motor driving system is illustrated.

The rail track 141 is provided with a plurality of primary drive units (referred to as LIM1) 142, having components such as the primary winding, disposed at a given spacing along the rail track 141.

The top section of the rail track 141 is formed into a first inclined surface 114U1 and a second inclined surface 141U2 both oriented symmetrically at 45° to the horizontal direction; the bottom section of the rail track 141 is formed into a third inclined surface 141D1 and a fourth inclined surface 141D2 both oriented symmetrically at 45° to the horizontal direction.

A frame member 130 disposed on the container (not shown) of the transport vehicle 101 is driven by a rotation device 131 and is capable of rotating within a given angle.

The secondary conductor member (LIM2) disposed on the linear motor driven system comprises a conductor member 112, for example an aluminum plate, and a magnetic plate 112a fixed on the container of the transport vehicle 101, so as to electrically couple with the primary drive units LIM1. The magnetic plate 112a is for making a magnetic circuit on the LIM2 units, and is made of a magnetic material for example an iron plate having specific capabilities.

There is a top end device 133, disposed on the upper end of the frame member 130, having a first roller 134U1 freely rotatably supported on a first rotation shaft 135U1, and a second roller 134U2 freely rotatably supported on a second rotation shaft 135U2, each being oriented at 45° to the horizontal direction.

The first roller 134U1 rotates on the first inclined surface 141U1 of the rail track 141, and the second roller 134U2 rotates on the second inclined surface 141U2 of the rail track 141.

There is a bottom end device 137 of the frame 131 having a bearing device 139 whose position is adjustable vertically by means of an adjusting screw 138.

The bearing device 139 has a third roller 134D1 freely rotatably supported on a third rotation shaft 135D1 and a fourth roller 134D2 freely rotatably supported on a fourth rotation shaft 135D2, each being oriented at 45° to the horizontal direction.

The third roller 134D1 rotates on the third inclined surface 141D1 of the rail track 141, and the fourth roller 134D2 rotates on the second inclined surface 141D2 of the rail track 141.

In a transport route, such as the route 102H shown in FIG. 34 having an approximately horizontal rail track 141, the weight of the transport vehicle 101 is supported by the first and second rollers 134U1, 134U2, and by operating the adjusting screw 138, it is possible to adjust the dimension of a spacing d1 between the third roller 134D1 and the third inclined surface 114D1, and the dimension of a spacing d2 between the fourth roller 134D2 and the fourth inclined surface 141D2. The dimensions of the spacings d1, d2 may vary depending on the manufacturing tolerances, operating temperature conditions, and the differences in the forming conditions for the straight track and the curved track.

In a vertical transport route, such as the route 102V shown in FIG. 34 having a vertical rail track 141, the spacing between the first roller 134U1 and the first inclined surface 141U1, and the spacing between the second roller 134U2 and the second inclined surface 141U2 of the rail track 141 are adjustable from zero to a maximum value by means of an adjusting screw.

Similarly, in the vertical transport route (102V in FIG. 34), the spacing between the third roller 134D1 and the third inclined surface 141D1, and the spacing between the fourth roller 134D2 and the fourth inclined surface 141D2 of the rail track 141 are also adjustable from zero to a maximum value by means of an adjusting screw 138.

In practice, the spaces d1, d2 are adjusted suitably by adjusting the adjusting screw 138 at the time of setting-up the system for operation, in accordance with the operating requirements so that the transport vehicle 101 can operate stably.

(2) Weighing Device

An example of the transport vehicle 101 suspended from the track 220 is illustrated in FIG. 36.

In this figure, the track 220 is firmly fixed to the frame 222 by the arm 223 through a plurality of rods 221a hanging from the ceiling member 221 of the track 220.

For operating the transport vehicle 101 with the linear motor, an output control device 224 for supplying switched power to the primary winding side of the system is suitably disposed on the frame 222, and on the side facing the transport vehicle 101 of the track 220, primary drive units (not shown) having a sensor are disposed suitably for detecting the arrival and the direction of travel of the primary winding of the linear motor and the transport vehicle.

The transport vehicle 101 shown by the dotted line is supported on each side by four front and the rear rollers 211 straddling the rail track 220.

The secondary conductor member 231 is disposed on the mobile side of the linear motor and is provided with the object sensing capability.

In the transport system having a vertical routing such as the one described above, it becomes difficult to move the transport vehicle upwards when the load on the vehicle becomes too high.

Therefore, there are weighing devices disposed on certain locations of the transport routes for determining the weight of the transport vehicle.

An example of such a weighing device is shown in FIGS. 37 and 38.

FIG. 37 is a cross sectional view of the track 210 where the weighing device is located. The reference numeral 211 refers to each of the four rollers, installed on the vehicle, rotating in contact with the track. The primary windings 218 of the linear motor are suitably disposed along the route 210, including the locations where the weighing device is located, to provide the driving force for the transport vehicle.

That is, the transport vehicle 101 is driven by the power supplied to the primary windings 281 of the linear motor, and moves along the track by being retained by the rollers 211.

Along the target locations on the track 210, the end portion 212a of the first arm 212 is fixed to the track 210 by means of screws 217a. The opposite end portion 212b of the first arm 212 fixed to the track 210 is constructed so as to enable the first arm 213 to slide vertically along a pair of parallel guides 213 shown in FIG. 38.

FIG. 38 shows a plan view of the guides 213 which are fixed to the bracket 214 which is in turn fixed to the immobile side.

Returning again to FIG. 38, a second arm 215 extending downward is joined in parallel to the guide 213 near the opposite end portion 212b of the first arm 212.

In other words, the horizontal thrusting force on the first arm 212, generated by the bending moment from the force of gravity of the track 210, acts on the side surface of the guide 213, but only the vertical component force is transmitted downwards along the guide 213 by the second arm 215.

The lower end portion 215a of the second arm 215 is fastened and joined to the measuring end portion 216a for the weighing sensor, for example a load cell 216, by means of screws 217b.

The fixed end portion 216b of the load cell 216 is fastened and joined to a base 219 formed integrally with the bracket 214 by means of screws 217c, 217d.

The base 219 is fixed to the immobile side (not shown).

The rail track 210 of the above configuration bears the entire weight of the transport vehicle 210 through the rollers 211.

The horizontal thrusting force generated by the bending moment due to the weight of the track 210 including the vehicle weight acts on the side surface of the guide 213, and only the vertical force is transmitted along the guide 213 to the measuring portion 216a of the load cell 216 by the second arm 215 joined to the lower end portion 215a.

Therefore, the lower end portion 215a of the second arm 215 bends the measuring end portion 216a in the turning direction with respect to the fixed portion 216b. A measuring circuit (not shown) transmits an electrical signal which is proportional to the amount of movement of the measuring portion 216a of the load cell 216 corresponding to the load to the control device (not shown) provided on the transport system. The control device (not shown) displays the measured weight according to predetermined conditions, and sounds an alarm when the measured weight exceeds the upper predetermined weight limit.

(3) Transport Vehicle Stopping Device

Next, it is necessary to explain how the system senses and stops the transport vehicle when the vehicle enters a proper position within a target station.

FIG. 39 is a front view of a stopper hook assembly for determining the position of the carrier (relates to a member for attaching the container box) and stopping the transport vehicle in the conventional transport system.

First, the construction of the assembly 301 is explained.

The assembly 301 is fixed to the rail track side of the linear transport system, and comprises: a box-shaped frame 302; a sliding shaft 303 disposed in about the middle of the frame 302; a left and a right slide blocks 304a, 304b mounted on the sliding shaft 303; and coil springs 305 which press the blocks 304a, 304b towards the center of the assembly 301. Spacer blocks 306 are fixed to the frame 302 by means of bolts 307 in the central vertical direction of the assembly 301. The slide blocks 304a, 304b are disposed symmetrically above/below and left/right in the overall view of the assembly, and each is provided with two hook support shafts 308, in the horizontal and perpendicular directions to the axial direction of the sliding shaft 303. Each sliding block 304a, 304b is provided with stopper hooks 309a, 309b, 309c and 309d of an approximately right angle triangle shape disposed freely rotatably around an axial bushing 310. Each of the stopper hooks 309a~309d is attached with a twist spring 311, and the right angle sides of the stopper hooks 309a, 309c slidingly contact the top inside surface 302a of the frame 302 and the side surface 306a of a spacer 306; while those of the stopper hooks 309b, 309d slidingly contact the bottom inside surface 302b of the frame 302 and the side surface 306b of the spacer 306.

The operation of the assembly 301 will be explained next. If a stopper pin 313 fixed in the horizontal direction on the carrier of the linear transport system, is moving from left to right, for example, the inclined surface portion of the stopper hooks 309a, 309b are pressured so that the stopper hook 309a moves counter clockwise in opposition to the force of the twist spring 311, while the stopper hook 309b moves in the clockwise direction in opposition to the twist spring 311. The vertical sides of the stopper hooks 309a, 309b slide against the side surfaces 306a, 306b of the spacer block 306 while the horizontal sides of the stopper hooks 309a, 309b separate from the inside surfaces 302a, 302b, and each of the the arc surfaces 309e slides against the inside surface 302a, 302b of the top and bottom frames, and the slide block 304a moves to the left side along the sliding shaft against the force of the coil spring 305 disposed around the hook support shaft 308. The stopper pin 313 enters the position shown by a double dot line, and stops by hitting the right side stopper hook 309c, 309d. In this case, the rotation of the stopper hook 309c, 309d is blocked by the top and bottom inside surfaces 302a, 302b of the frame, and therefore the slide block 304b moves slightly to the right but is returned to the original position by the force of the coil spring 305.

When the carrier starts moving from the locked position of the stopper pin 313 surrounded by the stopper hooks 309a–309d as shown in FIG. 39f the stopper pin 313 is released from the locked position by the stopper hooks 309a–309d when the overall assembly 301 moves towards the rear of and perpendicular to the plane of the paper. When it is not necessary for the carrier to stop at the position where the assembly 301 is disposed, the assembly 301 is also moved towards the rear of the plane of the paper.

(4) Vehicle position detection device

In a linear motor driven transport system, a carrier rides on the rail track to transport a vehicle from one station to another, and it is necessary that the vehicle be stopped at a precise predetermined position within the station. FIG. 47 shows an example of the conventional device for controlling the carrier position.

In FIG. 47, a carrier 410' is driven by a linear motor having a secondary conductor member 411, and is held on the crack and is transported along a ground-based structure 420'.

The carrier 410' is provided with a container 410A, shown by the double dot line, for carrying specified objects, and the container 410A is held on and run on the ground-based structure 420' with a container moving device 410B'. In this figure, illustration of the mechanism for coupling the container 410A with the container moving device 410B' is omitted.

The position of the carrier 410' is determined by a proximity switch 413, provided in a specified location within a station, which reacts to a striker 412. The striker 412 is disposed on the tip end of the first arm 412A provided on the container moving device 410B'.

(5) Primary Drive Unit Structure

FIGS. 40A to 40C show the primary drive units of the linear motor, in which FIG. 40A is a plan view; FIG. 46b is a front view of the unit shown in FIG. 40A; FIG. 40C is a side view of the unit shown in FIG. 40B; and FIG. 41 is a cross sectional side view of the primary drive unit of the conventional linear motor.

As shown in FIGS. 40A to 40C, the primary drive unit is made by punching out rectangular sheet pieces which are laminated into a core 501 of thickness L using a jig; clamping the core 501 with two machine fabricated clamps 502; tightening with bolts 503 and nuts 504; and attaching the assembly to the rail track with bolts of pitch P through the first and second bolt holes on the foot portion 505a, 505b disposed on the extension of the ends of the clamps 502.

(6) Emergency Braking Device

A cross sectional side view of an emergency braking device in the conventional linear motor transport system is shown in FIG. 42, and a partial cross sectional view seen in the direction of the arrow A is shown in FIG. 43.

In the transport system shown in FIGS. 42 and 43, the carrier 602 having a container 601 attached is provided with a carrier frame 604 which has a shape to embrace the rail track 603. The carrier 602 is moved in the horizontal direction (i.e. vertical to the plane of the paper in FIG. 42 by the interaction of the secondary conductor member 605 vertically attached to the carrier frame 604 and the linear motor 606 attached to a vertical plane 603a of the rail track 603. The rail track 603 is supported by the support portion 612 fixed to the fixing member 609. The brake shoe 608 is attached to the tip end of the upper arm 604a of the carrier frame 604 having the stopper pin 607 for determining the carrier position. In addition, a long brake assembly 610 extending in the vertical direction is attached to the fixing member 609 by means of bolts, and a longitudinal air bag 611 (refer to FIG. 43) is thus provided.

If an abnormal situation arises, such as a breakdown in the control system, compressed air is automatically pumped into the air bag 611, and expands the air bag 611, as shown by the double dot line in FIG. 43, and the emergency braking system is designed so that the friction forces between the air bag 611 and the brake shoe 608 stop the carrier 602.

(7) Rail track Structure

FIGS. 44A to 44C show a first example of the rail track arrangement having the linear motor attached in the conventional linear motor transport system. FIG. 44A is a partial side view; FIG. 44B is a bottom view of the arrangement shown in FIG. 44A; FIG. 44C is a side view of the arrangement shown in FIG. 44B. FIG. 45A to 45C show a second example of the rail track arrangement, including the electrical connections, having the linear motor attached thereto in the conventional linear motor transport system. FIG. 45A is a partial side view; FIG. 45B is a bottom view of the arrangement shown in FIG. 45A; FIG. 45C is a side view of the arrangement shown in FIG. 45B.

In the examples shown above, the components such as the linear motor 702, solid state relay 705, speed sensor 706, terminal stage 703, are attached to both side surfaces of the rail track 701.

It should also be noted that the lead wires 707 provide the electrical connection to other components.

(8) Container Structure

FIG. 46 shows a schematic cross sectional view of the construction of the containers 801-1 and 801-2 in the conventional linear motor transport system. These containers 801-1 and 801-2 are, respectively, provided with a door 802-1 and a door 802-2, only on one side thereof for loading and unloading objects. The container 801-1 moves in the horizontal X-direction on the track 803, and is led into a storage space 805 after passing through a branching point 804 and a straight, short branching track 803a. The container 801-2 moves in the X-direction on the main track 803, and is led into a storage space 805 after passing through a branching points 806, 807 and a looped branching track 803b.

In the storage space 805, there are storage spaces 808, 809 divided by a dividing wall 805a, and the storage spaces 808, 809 are provided with symmetrically disposed left and right stations 810, 811 with respect to the dividing wall 805a at the center. Each of the stations 810, 811 is provided with a center-opening swing door 810a, 811a, and the goods are loaded or unloaded by opening both types of doors, 810a, 811a of the stations on the one hand, and the doors 801-1, 801-2, 802-1 and 802-2 on the containers on the other.

Problems in the Conventional Systems

Problems in the conventional transport systems of the type described above will be discussed separately in the following for each of the components presented above under headings (1) through to (8).

(1) Problems in the Driving Mechanism of the Transport Vehicle

As shown in FIG. 35, the conventional system provided a stable operation of the vehicle, in the vertical and well as in the horizontal directions of the track, by clamping the rail with four rollers which are inclined to fit the edge of the inclined rail. In addition, spaces are provided to accommodate the changes in the dimensions of the rail and other factors of the operation of the tracks.

This type of configuration generated the following problems.

(1-1) When the power is supplied to the primary drive units LIM1, the backing plate (refer to FIG. 35) 112a provided on the secondary conductor member LIM2 is attracted to the LIM1 side, thereby moving the vehicle through a distance equal to the spasing d1 between the track and the rollers.

For this reason, in the curved sections of the track, for example, there is a danger that the surfaces on the LIM1 side and on the LIM2 may come into contact with each other. If the distance of the spacing d1 is made larger to avoid the contact of the surfaces, the system then became vulnerable to unstable motion, such as snaking, and depending on the operating condition, the forward thrust force is degraded.

(1-2) To meet changing conditions of deviations in the spacing (brought about by variations in temperature and assembling precision) between the rail track 141 and each of the rollers, throughout the various sections, such as horizontal, vertical, horizontal curves and vertical curves, it is necessary to finely adjust the spacings d1, d2 by means of the adjusting screw 138.

Specifically, if the spacings d1, d2 are to be adjusted to a target distance of 0.15 mm, the finished dimension of d1, d2 ranges between 0.1 to 0.2 mm. However, it is a difficult task to make an on-site adjustment to a heavy and complex structure in an ill-equipped environment, and depending on the conditions of the track, it may be necessary to make several adjustments before the system can operate smoothly.

(1-3) The above situation leads to a time consuming adjustment operation.

(1-4) The spacings d1, d2 change due to the forces of attraction between the LIM1 side and the LIM2 side.

(1-5) The rollers are attached at an angler which leads to misalignment because of the presence of the spacings d1, d2, thus leading to a problem of snaking of the vehicle.

(1-6) When the dimension of the spacings d1, d2 changes due to snaking, the distance between the LIM1 side and the LIM2 side changes, thus leading to fluctuations in the driving force for the vehicle.

(1-7) The snaking of the vehicle and changes in the spacing d1, d2 lead to vibrations and generation of noises.

(1-8) In the system of the conventional design described above, fine adjustment operations are unavoidable, thus leading to a large number of necessary components and complex structure as shown in FIG. 35 to provide a stable operation of the vehicle.

(1-9) Ultimately, it was difficult to reduce the number of materials needed and the manufacturing costs of the transport system.

(2) Problems in the Weighing Device

There are following problems in the conventional weighing devices.

(2-1) For the first arm tail end portion 212b to slide smoothly along the guide 213, it is necessary that the two guides 213 be constructed with precision. Therefore, the guide section required not only machining precision of the guide 213 and the first arm leading portion 213a, but also required precision in the assembly. Therefore, both machining and assembly operations became time consuming, and the resulting low productivity prevented lowering in the cost of manufacturing the system.

(2-2) The load measuring sensor (load cell) for the weighing device required precision assembly as explained above, and produced the following problems of assembly.

(a) The measuring end of the load cell and the second arm are connected with screws, and attention is required so as not to pre-load the load cell.

(b) The measuring end of the load cell and the second arm are connected with screws, and there is a danger of breakage due to excess force being applied co the load cell during transport of goods.

(c) The load cell is installed with the load cell in a horizontal position and such an arrangement wasted critical spaces and results in a large weighing device.

(3) Problems in the Vehicle Stopping Device

The conventional design of the vehicle stopping device including the stopper hook assembly presented the following problems.

The arc shaped section of the hook portion of the assembly is relatively difficult to fabricate; because it is necessary to attach four twist springs to each of the four stopper hooks; and machining precision of the inside surface of the top and bottom surfaces of the frame member must be high because the rotation of the stopper hooks brings them into direct contact with these surfaces.

(4) Problems in the Vehicle position detection device

In the conventional design of the vehicle position detection device, it is necessary to provide a first arm 412A for attaching the striker 412 for operating the proximity switch 413.

It is extremely difficult to provide spaces for providing striker and stopper hole within a limited available size and spaces of the peripheries of the carrier structure, and it makes the ground based structure 420' complex, and prevented lowering of the cost of producing the system.

(5) Problems in the Primary Drive Unit

The conventional design of the primary drive unit shown in FIG. 40A presented the following problems.

(5-1) As shown in FIG. 41, spaces G1, G2, G3 are generated between the bolts 503 and the laminated core 501, and between the bolt 503 and the two fabricated clamps 502, and because the spacing are variable, the assembly precision of the two clamps 502 became variable, and the assembly precision of the clamps 502 and the core 501 became variable.

(5-2) Even though it is necessary that the linear motors be installed at the same height, they are not installed at the same height.

(5-3) When the thickness L of the core is altered to meet the thrust requirement of the linear motor, the attachment angle P changes. However, if it is desired to maintain the same attachment angle P, then it is necessary to provide a foot portion of a complex design or to provide unnecessarily large foot portions.

(6) Problems in the Emergency Brake

The conventional design of the emergency braking device shown in FIG. 42 presented the following problems.

(6-1) It is necessary to provide a vertical brake assembly having air bags separately from the rail track.

(6-2) The position of attaching the air bag must be adjusted on site.

(6-3) The weight of the vehicle moving on the rail is increased because the brake shoe is attached thereto.

(7) Problems in the Rail Structure

In the conventional design of the rail structure, the following problems are presented.

(7-1) Because various devices are attached to both surfaces of the rail track, start-up adjustments become time consuming.

(7-2) Because various devices are attached to both surfaces of the rail track, there is an increase in the number of interconnect of the lead wires, and leads to an increase in the fabrication and assembly steps.

(7-3) Because both surfaces of the rail track are provided with precision devices, it is necessary to pay special attention to handling of the components for the rail tracks for shipping.

(8) Problems in the Container Structure

The conventional containers are provided with doors 802-1, 802-2 only on one side. For this type of door configuration, a short straight branching route 803a is acceptable when the container 810-1 is to be led into station 810. However, when the container 801-2 is to be led into station 811, it is necessary either to set up a looped branching route 803b as shown in FIG. 46 or to provide a short straight route (similar to route 803a), and the container must be passed through the branching point 806 once, and then the container must be reversed from the branching point 806 to enter the straight route. Therefore, when looped routes are necessary, not only the overall cost of installing the linear motor transport system increases, but there is also a necessity to secure sufficient area for installing looped branching routes. Further, complex control operations are necessary for reversing the container from a branching point to let the container enter a straight route.

SUMMARY OF THE INVENTION

An overall objective of the present invention is to provide an efficient and relatively low cost transport system, based on a linear motor drive, for transporting objects in a plurality of transport vehicles between a plurality of stations. Specifically, this objective has been achieved through the improvements in the various components of the transport system presented in the following.

The transport system of the present invention comprises:

(a) a rail track erected along a transporting route having branching routes;

(b) a plurality of linear motor driven transport vehicles moving along the rail track;

(c) a plurality of stations disposed at suitable locations along the route;

(d) at least one weighing device disposed on the plurality of stations;

(e) a vehicle stopping device including a stopper hook assembly disposed on each of the plurality of stations;

(f) a vehicle position detection device, disposed in the vicinity of the plurality of stations, comprising the stopper hook assembly cooperating with the vehicle stopping device;

(g) an emergency braking device disposed on non-horizontal rail tracks;

(h) a container associated with the transport vehicle for loading and unloading the goods;

(i) a scheduling controller for controlling the movement of the plurality of transport vehicles between the plurality of stations, wherein at least the components (e), (f), (g) and the primary drive unit are wholly or partially disposed on one side of the fixed rail track of the transport system so as to enable efficient servicing of components and offer reliable control of the vehicle in the transport system.

In the transport system presented above, the weight of the objects loaded on the container at the various stations is measured with a compact weight measuring device of a simple and rugged design, and if the weight is within the allowable weight limit, the transport vehicle is allowed to leave a station. If an emergency situation arises, the emergency braking device is operated to stop the transport vehicle quickly and efficiently because the unnecessary weight of the air bag has been eliminated and the brake shoe is not disposed on the moving vehicle. When the transport vehicle approaches a target station, the stopper hook assembly of a simple and rugged design is activated, and the presence of the transport vehicle in the target station is sensed by a simple and reliable device disposed on the secondary member of the drive unit. The primary drive unit, the vehicle stopping device, the vehicle position detection device and the emergency braking unit (on the vertical section of the track) are all placed on the side of the rail which faces the transport vehicle. This arrangement of the components of the system on one side of the rail facilitates manufacturing, assembling and servicing of the components. The overall result is that not only the cost of manufacturing the system has been reduced, but also the overall transportation operation has been improved with minimal maintenance requirements so as to enable the application of the transport system in any facility requiring handling of a large number of goods and information, such as parts, medical charts, and documentations in factories, hospitals, libraries and other such organizations.

The above summarizes the features of the transport system of the present invention that the plurality of transport vehicle are safely and efficiently guided to their respective target station. Improved features of each of the components are explained below with reference to specific construction details of the respective components.

A feature of the present transport system is that because a vertical surface and an inclined surface are provided as a pair on top and bottom portions of the rail track, the design of the transport system has been simplified and very little adjustments are required in positioning the spacing between the rollers and the rail track.

Still another feature of the present transport system is that the top bearing device is made to be freely swivelling about a vertical axis, and the bottom bearing device is made to be freely swinging about a fulcrum, and these arrangement of the bearing devices assures that the bottom rollers are pressed firmly against the bottom track surfaces, irrespective of the changes in the curvature of the track. This configuration provides the following benefits: forces of attraction between the primary and the secondary conductor members do not adversely affect the horizontal position of the vehicle; prevents contact between the primary and the secondary drive; the driving power is maintained constant; the contact between the rollers and the track surfaces are automatically maintained; the riding behavior is stabilized and less noises are generated; structure is simplified leading to lower cost of making the system.

Still another feature of the present transport system is that the weighing device of the present invention provides a precision weighing device of a simple and rugged construction, resulting in a versatile configuration which is adaptable to a variety of track shapes and sized.

Still another feature of the present transport system is that the stopper hook assembly of the present invention is a compact device, relative to the conventional devices, requiring relatively less precision in the components, and enables a significant reduction in the manufacturing cost of the assembly.

Still another feature of the present transport system is that the stopper hook assembly of the present invention is a simple device, relative to the conventional devices, and enables the use of readily available components of regular precision, and enables a significant reduction in the manufacturing cost of the assembly.

Still another feature of the present transport system is that the vehicle position detection device of the present invention can be placed in a limited space available on the secondary conductor member; eliminated the need to provide a proximity type of sensors; and provided an overall simplification in the method of installing the detection device to detect and stop the transport vehicle at the specified position in a target station.

Still another feature of the present transport system is that the primary drive unit of the present invention is a simple device thus leading to a lower cost of fabrication; is a precision unit despite its simple construction, and is capable of providing increased performance of the motor drive; is flexible since the thickness of the core member can be increased to an extent without changing the spacing between the primary drive units disposed along the track.

Still another feature of the present transport system is that the emergency braking device of the present invention is a compact device without the requirement for a lengthy airbag as in the conventional braking devices; and there is no additional load placed on the transport vehicle because the braking device is disposed on the immobile side of the transport system.

Still another feature of the present transport system is that the control devices for the primary drive unit are disposed on the immobile side of the transport system, and the control devices may be unitized by having all the control devices in a box; and the box can be made by a molding process which enables molding of a shielding plate in the box. The unitized control unit is more readily serviceable as they are accessible and require less wiring.

Still another feature of the present transport system is that the container configuration of the present invention is easy to operate but is more versatile than the conventional container because it is openable in both left and right direction, as viewed in the direction of transport. This type of configuration is suitable for a complex routing which require no provision of special looping tracks, and the control operation is simplified because there is no need to reverse the transport vehicle after passing a branching point as in the conventional transport system.

As explained above, the transport system of the present invention is generally a simplified system requiring less precision in fabrication of the components, and yet the overall cost/performance ratio of the transport system is superior to that of the conventional system, because of the generally lower cost of making the system. The cost of operating the transport system is lower also because the components are made to require less set-up and maintenance work. Therefore, it follows that the transport system comprising the improvements represented in the embodiments of the present invention represents a significant progress in the art of transporting objects and information such as parts, medical charts, and documentations in factories, hospitals, libraries and other such organizations.

BRIEF EXPLANATION OF THE DRAWINGS

FIG. 5 shows an embodiment of the weighing device of the present invention.

FIG. 21A is a partial cross sectional side view of a first embodiment of the primary drive unit of the present invention.

FIG. 21B is a bottom view of the primary drive unit shown in FIG. 21A.

FIG. 22A is a partial cross sectional side view of a second embodiment of the primary drive unit of the present invention.

FIG. 22B is a side view of the primary drive unit shown in FIG. 22A.

FIG. 27 is an illustration of a track routing using the container configuration of the present invention.

FIG. 45A shows a second example of the rail track arrangement in the conventional transport system.

FIG. 45B is a bottom view of the arrangement shown in FIG. 45A.

FIG. 45C is a side view of the arrangement shown in FIG. 45B.

FIG. 47 shows a vehicle position detection device in the conventional transport system.

PREFERRED EMBODIMENTS OF THE INVENTION

The presentation of the preferred embodiments will be made in the following order.

(I) Overall system of the linear motor driven transport system of the present invention;

(II) Transport drive, including transport vehicle, carrier and rail track configuration;

(III) Weighing device;

(IV) Vehicle stopping device;

(V) Vehicle position detection device;

(VI) Primary drive unit structure;

(VII) Emergency braking device;

(VIII) Linear motor unit;

(IX) Container structure.

(I) Overall System

Figure 33:
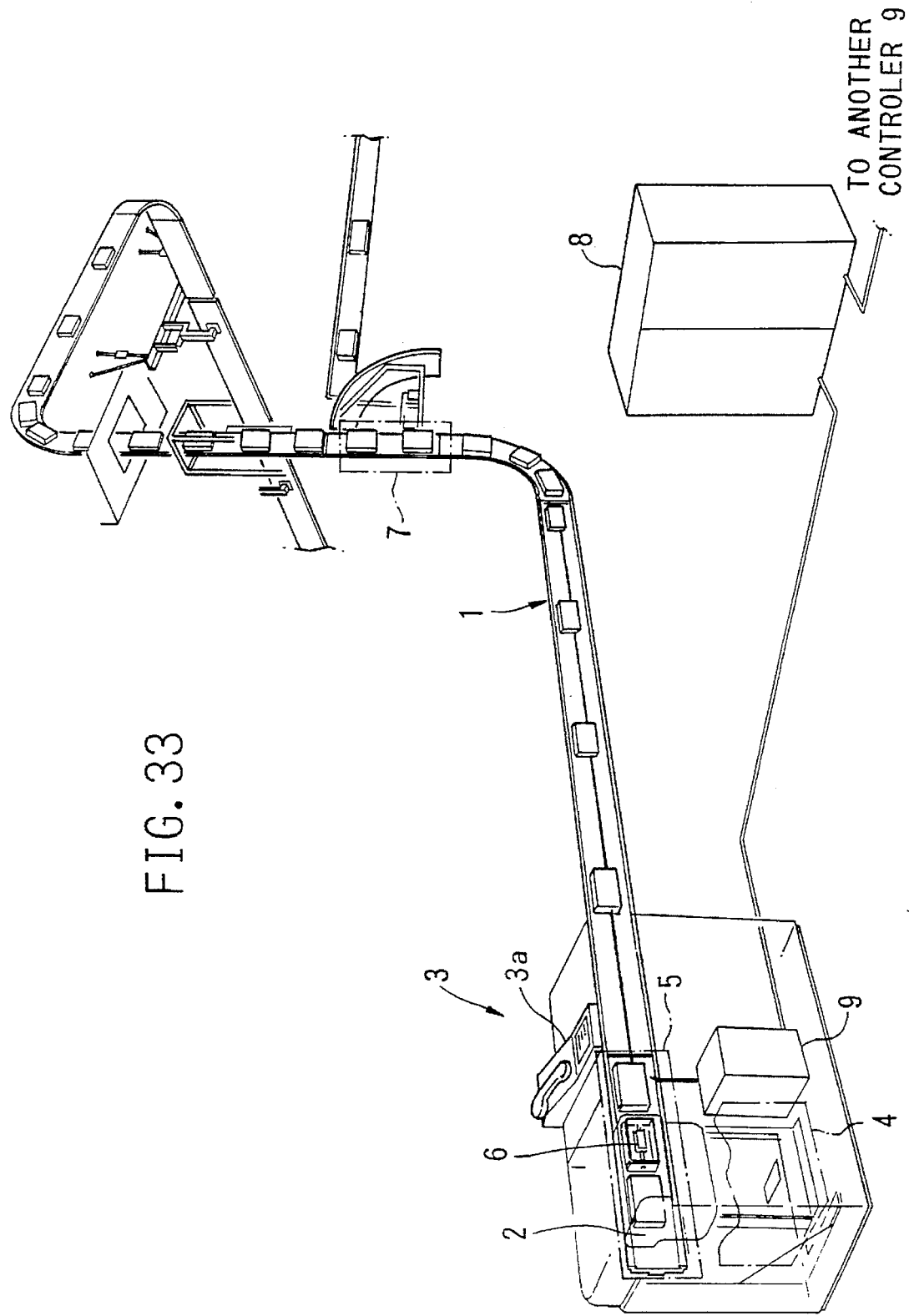
FIG. 33 is an illustration of the overall transportation system based on the linear motor drive applicable to the present invention.
Figure 34:
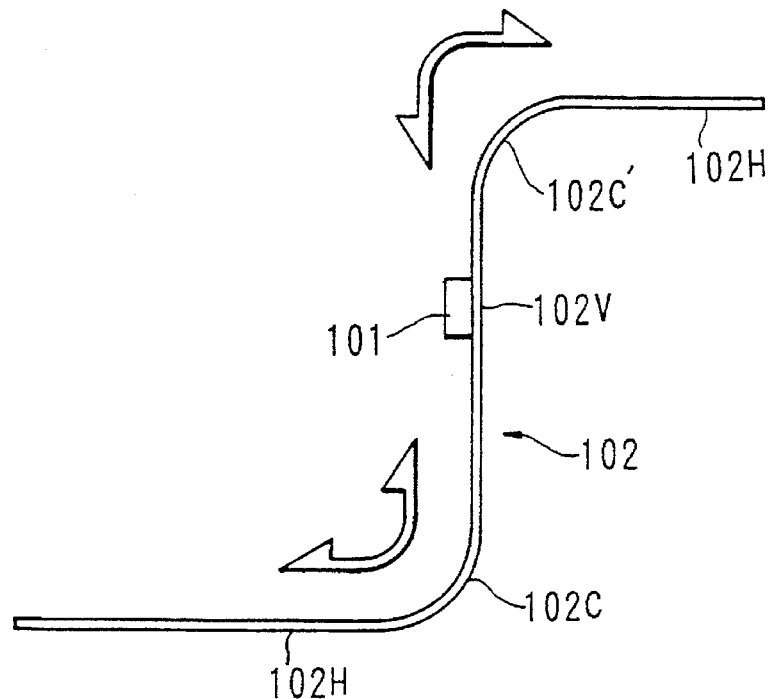
FIG. 34 is an illustration of the track configuration used in general transport system.
Figure 39:
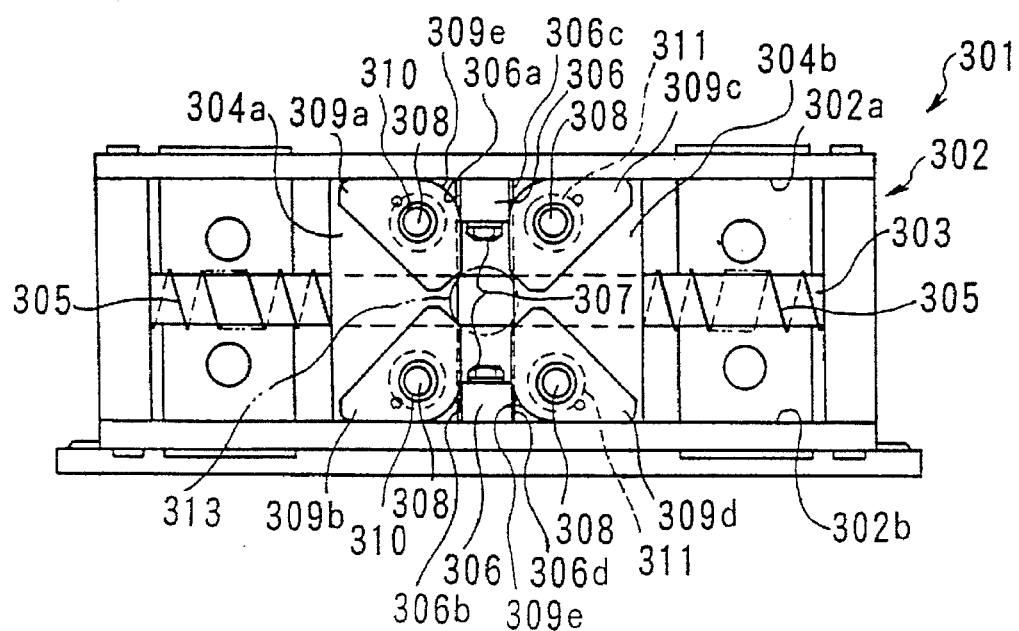
FIG. 39 shows the front view of the stopper hook assembly in the conventional transport system.
Figure 35:
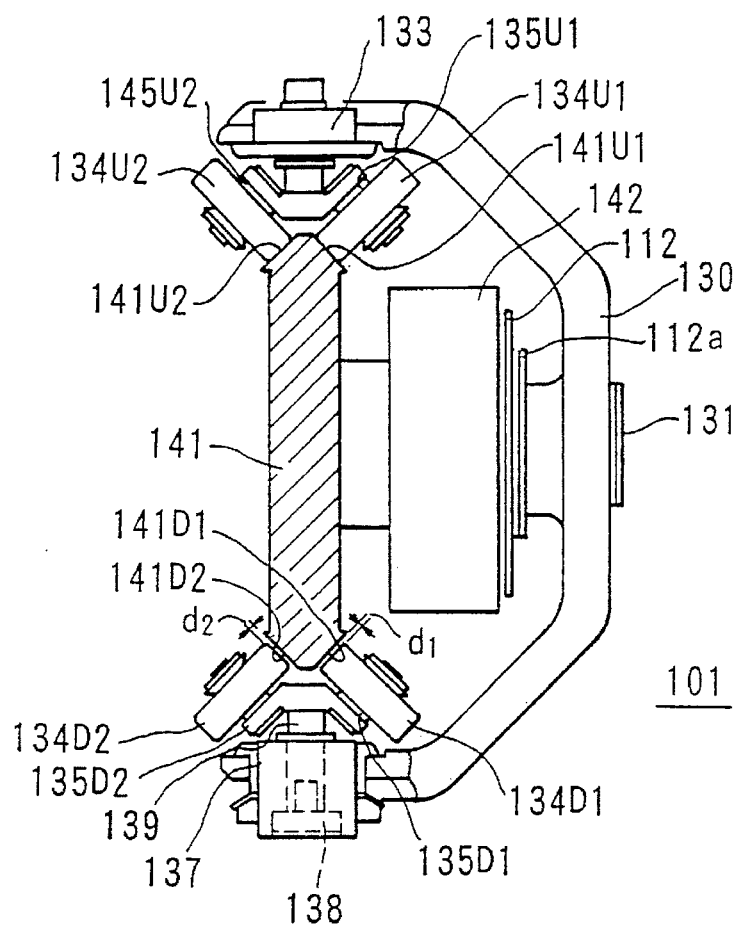
FIG. 35 shows the configuration of the rail track and the vehicle in the conventional transport system.
Figure 36:
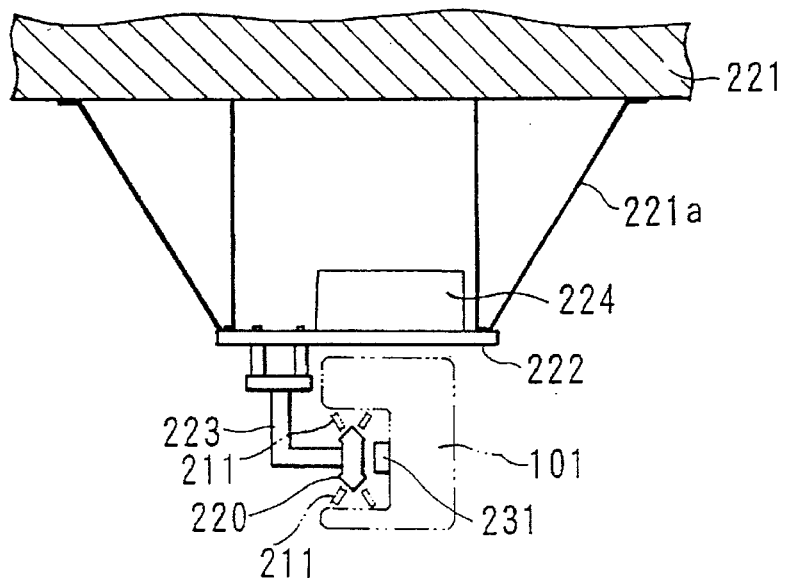
FIG. 36 shows the rollers for holding the transport vehicle on the rail track in the conventional transport system.

FIG. 33 is an illustration of the overall view of the configuration of the transport system related to the present invention.

The rail tracks 1 define the basic routing of the system constructed in a three dimensional space, and comprised of a network of branching/merging horizontal tacks, curved tracks and vertical tracks. Goods to be transported are placed in a transport vehicle 2 driven by a linear motor, including a container and a carrier which is attached to the transport vehicle 2 and is movably coupled to the rail track 1. Stations 3 for loading or unloading objects (goods in this embodiment) are disposed at suitable locations along the transport route, and are provided with a command terminal 3a for dispositions of the goods. The reference numeral 4 refers to a weighing device disposed at the station 3, and is used to determine the weight of the transport vehicle 2. The transport vehicle 2 is stopped at a selected location within the target station 3 by the action of a stopper hook assembly 5 for determining the vehicle position. If a transport vehicle 2 is approaching the station 3, this is sensed by a position detection device 6 provided to detect the presence of the stopper hook assembly 5. The reference numeral 7 refers to an emergency braking device, and operates to stop and retain the transport vehicle 2 at any place along the rail track 1, including the vertical section of the track. The driving mechanism is controlled by a schedule controller 8, and controls the forward thrust of the linear motor which drives the transport vehicle 2. The reference numeral 9 refers to the master computer which manages the operation of the system by commanding a plurality of schedule controllers 8 and operational phases such as the position and the destinations of the transport vehicle 2.

The transport system described above operates in the following manner.

First, an operator loads a container of the transport vehicle 2, and provides instructions, such as the destination, through the command terminal 3a. At this time, if the weight of the transport vehicle 2 should exceed the allowable weight limit, as determined by the weighing device 4, the operator is so notified through the command terminal 3a, and transport will be refused. If the weight of the transport vehicle 2 is below the allowable weight limit, the stopper hook assembly 5 is opened, and, by the command of the schedule controller 8 the transport vehicle 2 is moved to the target station.

It is understood that a plurality of transport vehicle 2 are moving on the rail track 1 at any one time, and the master computer 9 controls the movement of the vehicles to avoid collision and other problems. If a problem should develop during the transport of the transport vehicle 2 anywhere on the track, the emergency braking device 7 becomes operative, and immediately stops the travel of the transport vehicle 2, thereby preventing the generation of additional problems.

When the transport vehicle 2 arrives at the target station 3, the vehicle position detection device 6, disposed near the entrance to the target station, detects the presence of a transport vehicle 2, resulting in opening of the previously-closed stopper hook assembly 5. The transport vehicle 2 is made to stop at the location governed by the stopper hook assembly 5, and the goods are unloaded from the container. The vacant container is assigned to carry new loads.

As described above, the transport system of the present invention is able to simultaneously and efficiently handle transportation of goods between a plurality of stations 3 using a plurality of transport vehicle 2. The loading weight is controlled, and emergency stopping mechanisms are provided to assure safe operation of the system.

(II) Transport Drive

The linear motor driven transport system of the present invention for providing the motive power for the transport vehicle 2 of the present invention will be explained with reference to FIGS. 1 to 3.

Figure 1:
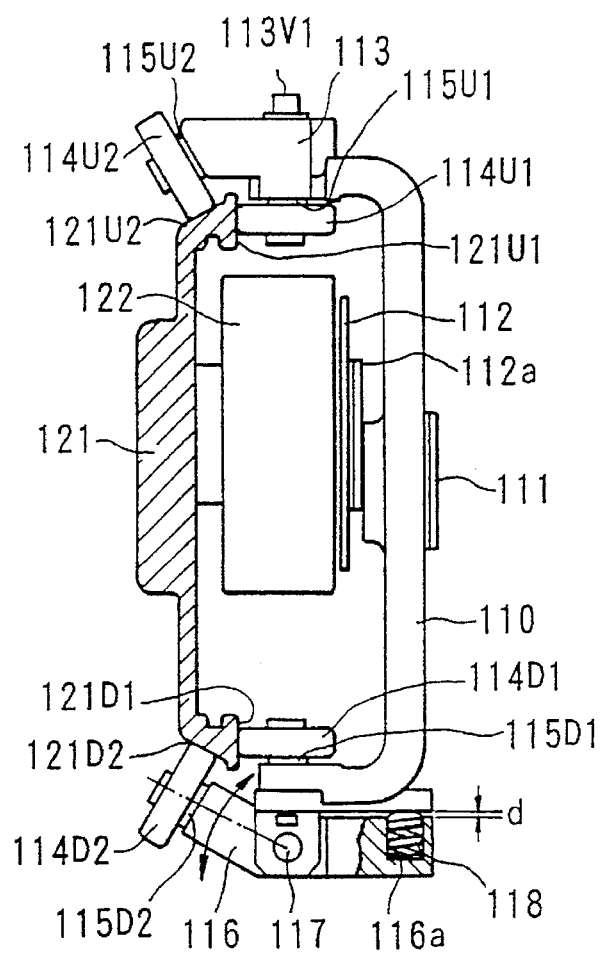
FIG. 1 is a cross sectional view of the main components of the motive mechanism of the present invention for driving the transport vehicle.

FIG. 1 shows a cross sectional view of the main components of the rail track and the vehicle, and ancillary sensing and control components which are not directly needed for the explanation of the present invention are omitted.

In FIG. 1, the numeral 110 designates a frame attached to the container 2 which is rotated by a rotation device 111 and is rotatable within a given angle around the shaft of the rotation device 111.

The numeral 112 refers to an electrical conductor, for example aluminum, disposed on the secondary side of the linear motor (referred to LIM2), and is fixed to the container; 112a is a magnetic plate, for example iron plate, for forming a magnetic circuit in the LIM2 side of the system.

Figure 2:
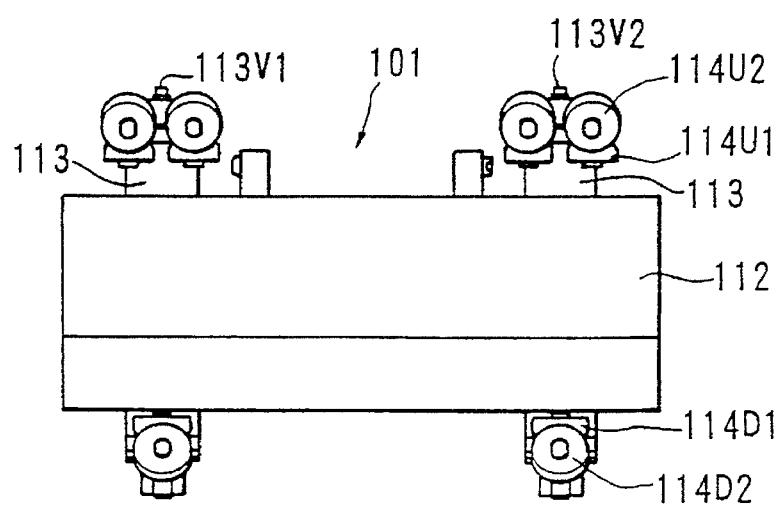
FIG. 2 is a bottom view of the transport vehicle shown in FIG. 1.
Figure 3:
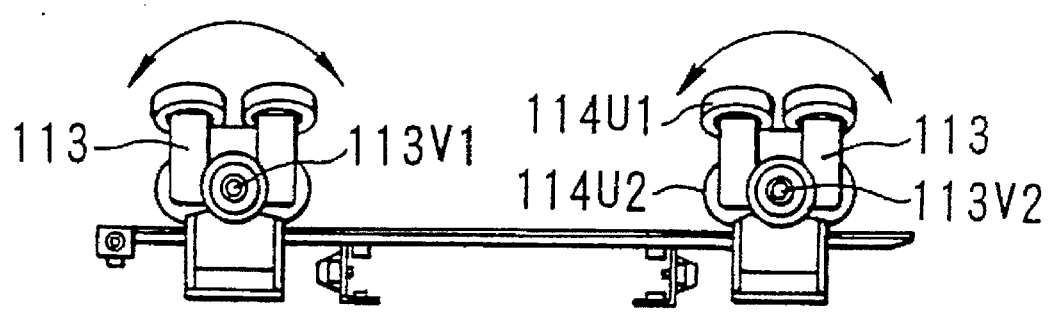
FIG. 3 is a top view of the transport vehicle shown in FIG. 1.

The top portion of the frame 110 is provided with a pair of top bearing devices 113, as shown in FIGS. 1 to 3, which are able to oscillate about the vertical axes 113V1, 113V2, and are equipped with a rotation shaft 115U1 for a first roller 114U1, and a rotation shaft 11SU2 for a second roller 114U2. These rollers are freely rotatably disposed on the respective rotation shafts which are separated by a specific angle, for example 135°. The reason for configuring the rollers to oscillate is to improve the riding behavior of the transport vehicle 2 on the rail track when it is moving from a straight track to a curved track.

The bottom portion of the frame 110 is provided with a rotation shaft 115D1 for freely rotatably supporting a third roller 114D1.

The bottom portion of the frame 110 is also provided with a bottom bearing device 116 which is freely pivotable about a fulcrum 117 in the direction shown by the arrows in FIG. 1. The center point of the fulcrum 117 is colinear with the center point of the shaft 115D1 for the third roller 114D1.

The bottom bearing device 116 is provided with a rotation shaft 115D2 for freely rotatably supporting a fourth roller 114D2. The third roller 114D1 and the fourth roller 114D2 are separated by a specific angle, for example 135°.

The opposite end to the fourth roller 114D2 of the bottom bearing device 116 is constructed so that a hole 116a which extends parallel to the rotation shaft 115D1 (for the third roller 114D1) can house an elastic device such as a spring member 118. Between the frame 110 and the bottom bearing device 116, there is provided a spacing d, and the spring member 118 acts in the direction to enlarge the spacing d.

This arrangement ensures that the fourth roller 114D2 is pressed at right angles against the surface of the bottom inclined surface 121D2 of the rail track (which will be described later) by the force of the spring member 118.

The dimension of the spacing d is chosen such that large movements of the fourth roller 114D2 about the fulcrum 117 would not generate mechanical interferences with the track.

The reference numeral 121 in FIG. 1 represents the rail track, serving as the means for moving the transport vehicle 2 through the system, to which the above mentioned four rollers bears against and rotate thereon.

The top portion of the track 121 is provided with a top vertical surface 121U1 for contacting and rotating the first roller 114U1, and a top inclined surface 121U2 for contacting and rotating the second roller 114U2. The vertical surface 121U1 and the inclined surface 121U2 are separated by a suitable angle, for example 45° in this embodiment, to be compatible with the angle separating the first roller 114U1 and the second roller 114U2.

The bottom portion of the track 121 is provided with a bottom vertical surface 121D1 for contacting and rotating the third roller 114D1, and a bottom inclined surface 121D2 for contacting and rotating the fourth roller 114D2. The vertical surface 121D1 and the inclined surface 121D2 are separated by a suitable angle, for example 45° in this embodiment, to be compatible with the angle separating the third roller 114D1 and the fourth roller 114D2.

The reference numeral 122 in FIG. 1 refers to a transport drive member (referred to as LIM1) disposed on the primary drive side of the transport system.

FIG. 2 shows a bottom view of the vehicle for the transport vehicle 101, and FIG. 3 shows a top view of the same.

In FIGS. 2 and 3, the reference numeral 112 refers to a secondary drive LIM2 of the transport system. A pair of first rollers 114U1 and second rollers 114U2 are disposed on the carrier of the transport vehicle 101, and two pairs of such rollers are provided on the front and back of the transport vehicle 101 so that they can rotate around the axes 131V1, 131V2, and oscillate in the direction of the arrows shown in FIG. 3 while supporting the weight of the transport vehicle 101.

A pair of third rollers 114D1 and the fourth rollers 114D2 on the bottom portion of the carrier are disposed on the front and the back, making a total of two pairs on the carrier, and are designed to stabilize the orientation of the transport vehicle 101 on the rail track 121.

In the configuration presented above, when the transport vehicle 101 is driven by the power provided to LIM1, the fourth roller 114D2 maintains constant contact with the bottom inclined surface 121D2 by the force of the elastic device 118, therefore, even if the dimensional conditions of the track change during the movement of the transport vehicle 101, each roller always stays on the track while the vehicle is moving thereon.

Furthermore, with the configuration shown in FIG. 1, the spacing between the LIM1 and the LIM2 is maintained constant even when the force of attraction generated by the LIM1 acts on the magnetic plate 112a forming the magnetic circuit in the LIM2, because the first roller 114U1 is held vertical by the top vertical surface 121U1, and the third rollers 114D1 is held vertical by the bottom vertical surface 121D1.

The above embodiment illustrates the basic technical concept related to the present invention, and many modifications can be made without deviating from the basic concept disclosed.

For example in the embodiment illustrated, the intimate contact between the rollers and the inclined surfaces were maintained by means of a fulcrum and a spring member disposed away from the rollers, and the provision of a spacing for the elastic member part, but the structure and the position of the elastic member part may be changed to achieve the same effect. The important concept is to provide means for stable operation of the transport vehicle on the rail track, and this can be achieved by various arrangements to maintain contact between the rail surface and the roller surfaces.

(III) Weighing Device

Figure 37:
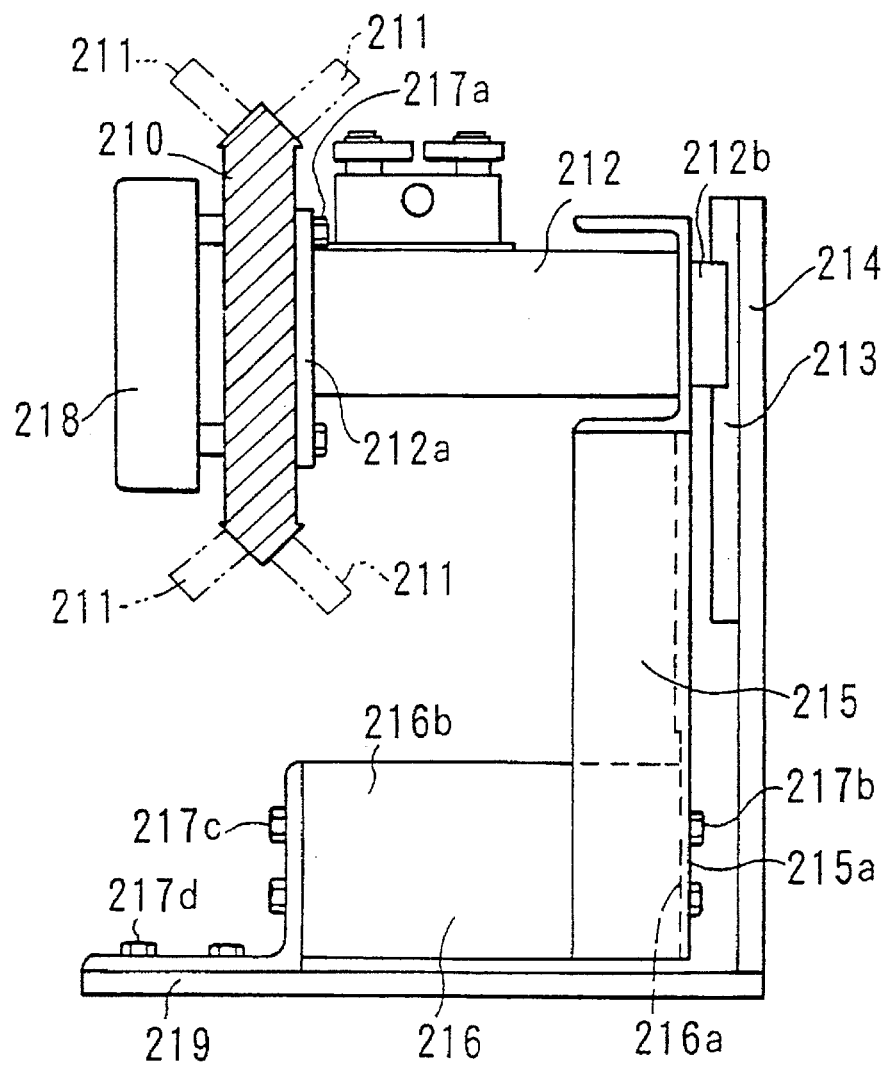
FIG. 37 shows the arrangement of the weighing device in the conventional transport system.
Figure 38:
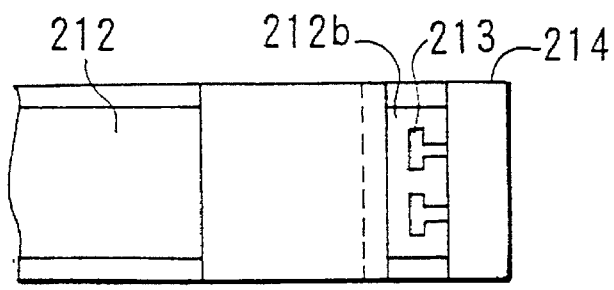
FIG. 38 shows a top view of the guide section of the weighing device shown in FIG. 37.
Figure 40C:
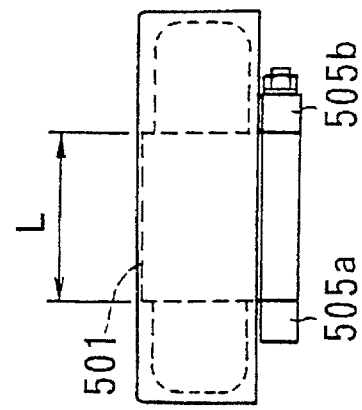
FIG. 40C is a side view of the primary drive unit shown in FIG. 40A.
Figure 40A:
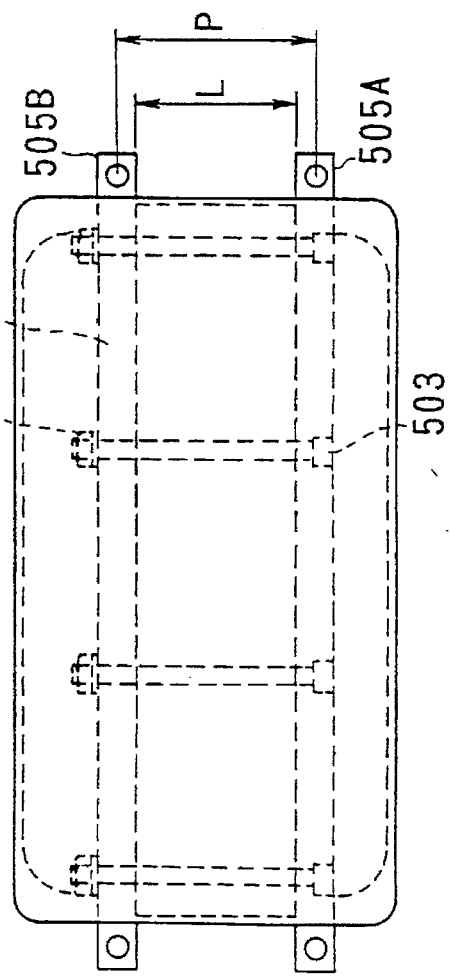
FIG. 40A is a plan view of the primary drive unit in the conventional transport system.
Figure 40B:
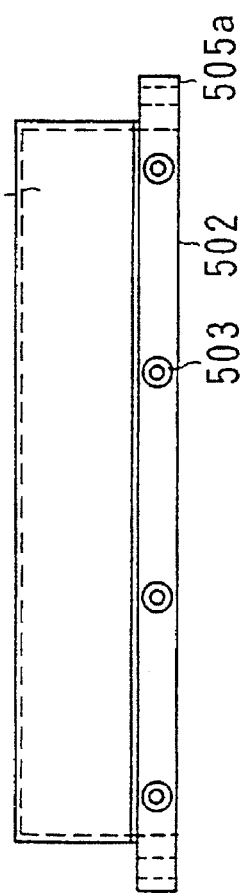
FIG. 40B is a front view of the primary drive unit shown in FIG. 40A.
Figure 41:
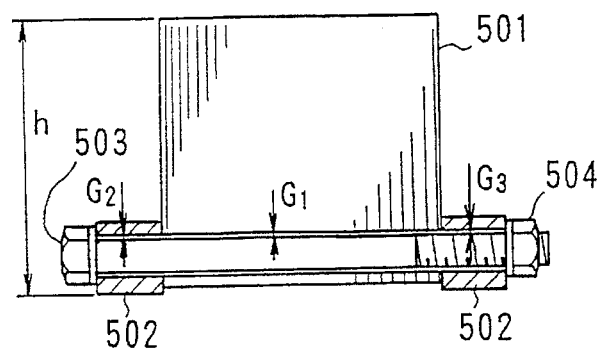
FIG. 41 is a cross sectional side view of another primary drive unit in the conventional transport system.
Figure 42:
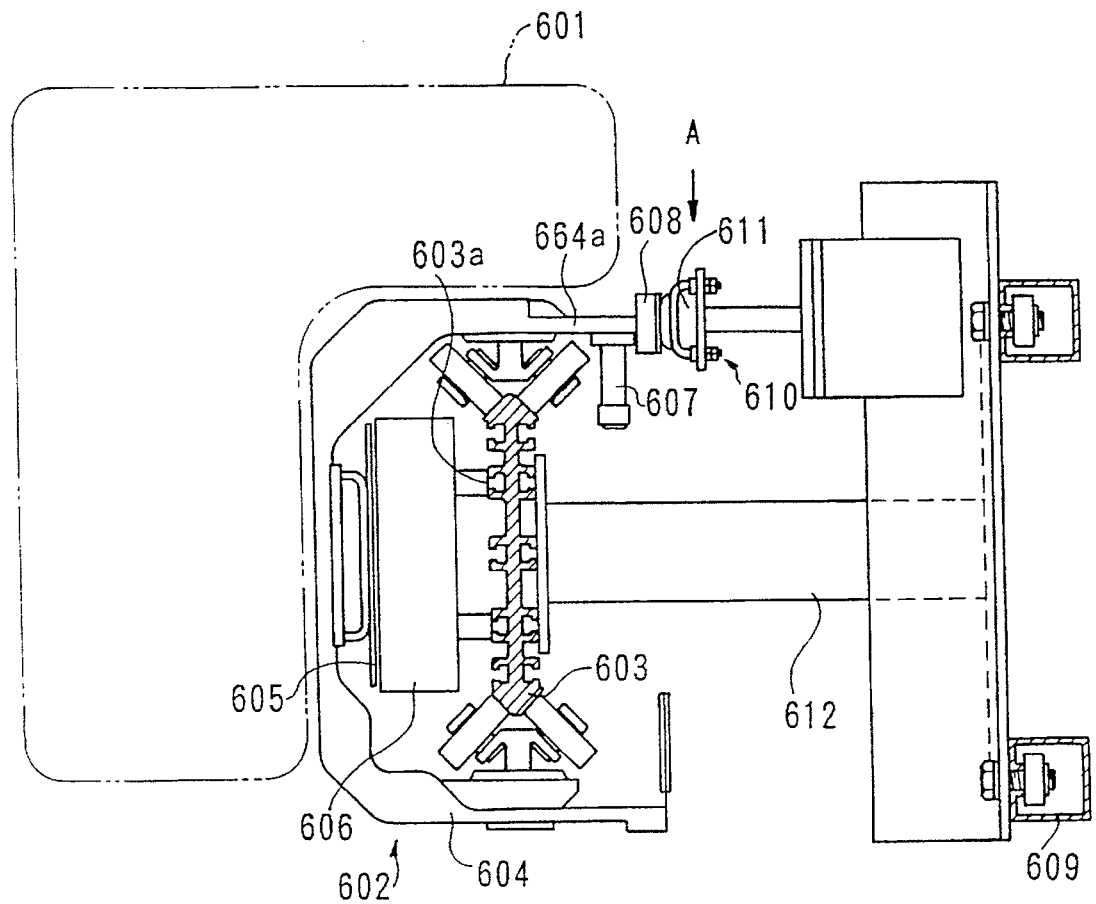
FIG. 42 is a cross sectional view of an emergency braking device in the conventional transport system.
Figure 43:
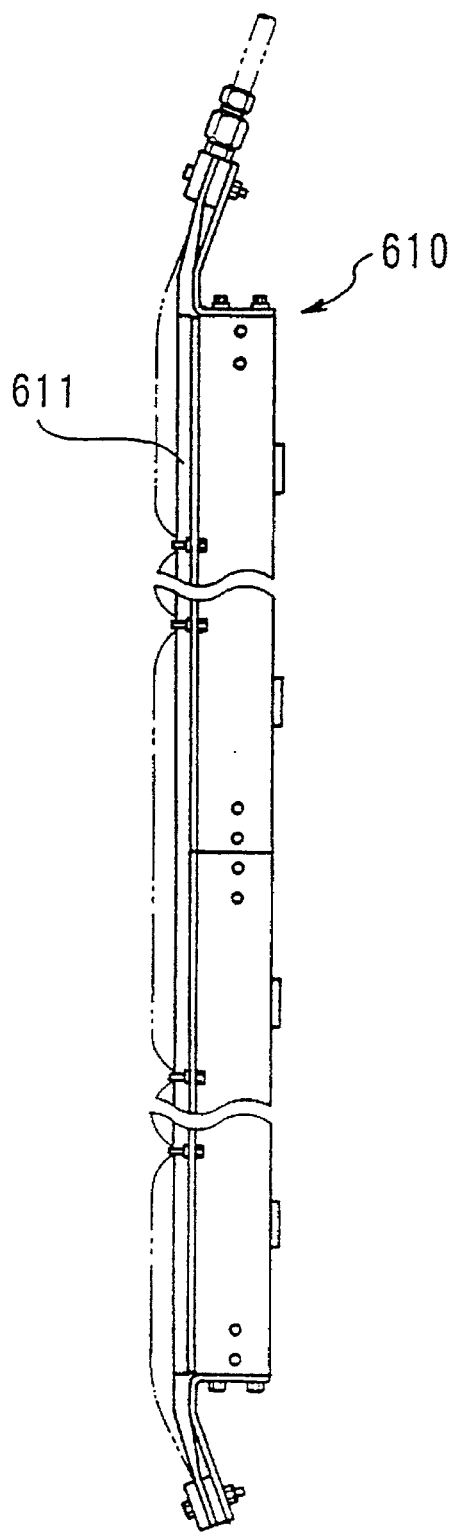
FIG. 43 is a partial cross sectional side view of the emergency braking device shown in FIG. 42.
Figure 44A:
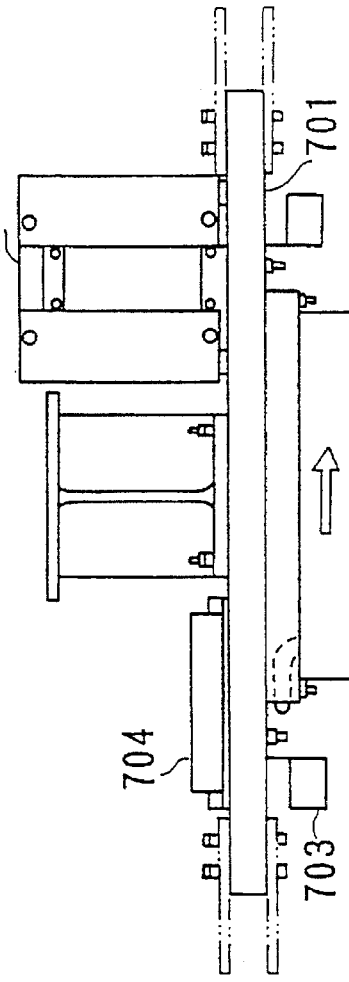
FIG. 44A shows a first example of the rail track arrangement in the conventional transport system.
Figure 44B:
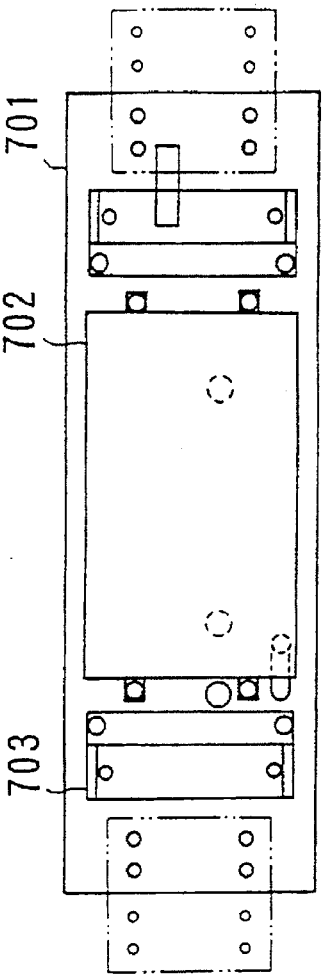
FIG. 44B is a bottom view of the arrangement shown in FIG. 44A.
Figure 44C:
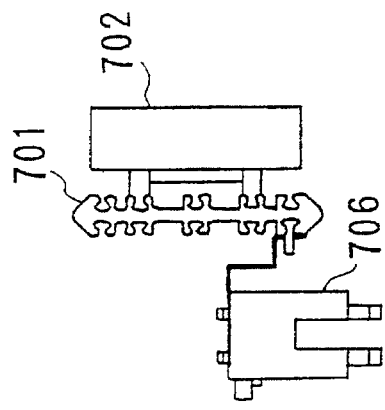
FIG. 44C is a side view of the arrangement shown in FIG. 44B.

An embodiment of the weighing device for the linear motor driven transport system of the present invention will be explained with reference to FIGS. 4 and 5. In the embodiment, those parts which are the same as those shown in the conventional weighing device shown in FIGS. 37, 38 are given the same reference number and their explanations will be omitted.

Figure 4:
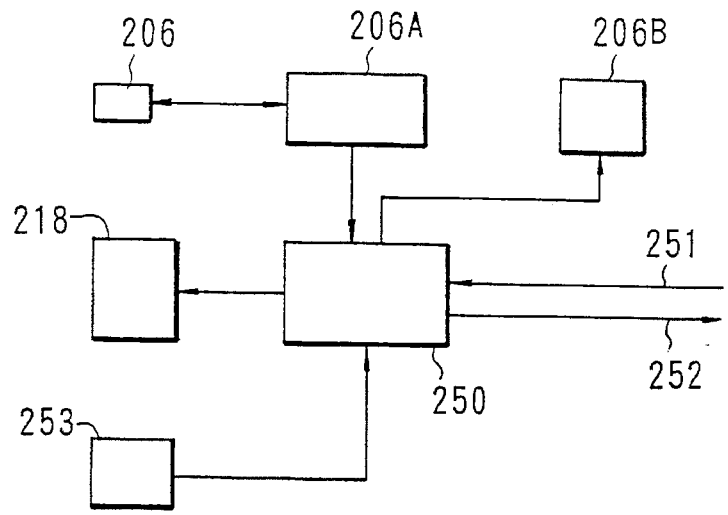
FIG. 4 is a block diagram of the measuring circuit for the weighing system.

FIG. 4 shows a block diagram of the weighing circuit. The load cell 206 comprises a measuring circuit 206A for the load cell 206, comprising strain gages, to measure the strain in the weighing device, and the displays device 206B displays the measured results, and is provided with a warning capability to display a warning when the transporting load exceeds the allowable weight limit.

In FIG. 5, the rail track 122 is provided with: a first roller 114U1; a top vertical surface 121U1 contacting with and rotating the first roller 114U1; a second roller 114U2; a top inclined surface 121U2 contacting with and rotating the second roller 114U2; a third roller 114D1; a bottom vertical surface 121b1 and a fourth roller 114D2; and a bottom inclined surface 121D2 contacting with and rotating the fourth roller 114D2. The rail track 121 is connected with screws 295, 296 to the tip end 201a of the first arm 201 through a connecting member 290.

The reference numeral 110 refers to a frame; 111 is a rotation device; 112 is an electrical conductor comprising the secondary drive LIM2 of the linear motor; 112a is a magnetic plate comprising the LIM1; 113 is a pair of top bearing devices which is associated a first roller 114U1, a second roller 114U2, both of which rollers 114U1 and 1t4U2 are respectively supported on rotation shafts 113V to enable rotazion.

The first roller 114U1 and the second roller 114U2 are supported freely rotatably on respective rotation shafts 115U1, 115U2, and are separated by a specific angle, for example, the first roller 115U1 is at 0° and the second roller 115U2 is at 45° with respect to the vertical center line of the top bearing device 113.

At the bottom end of the frame 110, a third roller 114D1, a fourth roller 114D2 are freely rotatably supported on rotation shafts 115D1 and 115D2, respectively.

The numeral 116 refers to a bottom bearing device which is provided with a rotation shaft 115D2 for freely rotatably supporting a fourth roller 114D2. The fourth roller 114D2 is arranged to pivot about the fulcrum 117, and is pressed at right angles to the bottom inclined surface 121D2 of the rail track 121 by the spring member 118 provided at the remote end of the bottom bearing device 116.

The dimension of the spacing d is chosen such that large movements of the fourth roller 114D2 about the fulcrum 117 would not generate mechanical interferences with the track. L1' refers to the distance between the center of the rod member 203 and the center of gravity of the rail track 121, L2' refers the distance between the centers of the rod member 203 and the measuring end 205 of the load cell 206.

The weighing device of the present invention of the above described configuration operates in the following manner.

The total weight of the transport vehicle acts on the rail track 121 through the rollers 114U1, 114U2, 114D1 and 114D2. The combined weight W of the weight of the transport vehicle and the rail track generates a bending moment on the first arm 201 through the rotation of thereof around the rod member 203 which freely rotatably supports the first arm 201.

Therefore the second arm 202 connected to the first arm 201 is also subjected to rotating moment through a freely rotatable rod member 203. Therefore, the bottom end 202a of the second arm 202 presses horizontally against the measuring end 205 of the load cell 206.

The result is that the strain gages comprising the load cell 206 are subjected to strain resulting in changes in their resistance, and the resulting signals proportional to the pressing force on the measuring end 205 are outputted by the measuring circuit 206A.

The outputted signal M is related to the weight W of the rail track including the transport vehicle, and the lengths L1 and L2 through a conversion factor "a" as shown in the following equation (1).

$$M = a(L1'/L2')W \tag{1}$$

Because the weights of the transport vehicle itself and the rail track are already clearly known, the correct weight w of the goods being transported can be calculated according to the following equation (2):

$$w = \{M/a(L1'/L2')\} - WK \tag{2}$$

where WK represents a sum of the weights of the transport vehicle itself and the rail track.

In the above equation (2), the value of L2' can be varied to suit the conditions of operation so as to maintain the optimum condition for measuring the strain by the load cell 206, for example, the best linearity and sensitivity.

Also, depending on the geometry of the transport system, it may be necessary to change the length of the first arm, and if this is necessary, the length of L2 can also be changed to maintain optimum operation of the measuring circuit.

In some cases, it may be that only the length of the first arm need to be changed.

The above embodiment illustrates the basic technical concept related to the present invention, and many modifications can be made without deviating from the basic concept disclosed.

For example, it is obvious that the weighing device of the present embodiment is applicable to tracks and transport vehicles of other designs than those illustrated in the previous embodiments.

Also, the above embodiment related to a linear motor driven system, but the weighing device of the present embodiment is applicable to transport systems having other types of motive power.

Circuit means other that that shown in FIG. 5 for measuring the combined weight can also be used in the weighing device, for example, the associated function provided for the output control device 250 can be divided suitably or parts thereof included in an upstream control device.

The display device 206B can also be simplified by eliminating the display capability for measured results, and leaving only the warning device, as appropriate for the transport system under consideration.

The data transmission line 252 can be used to forward measured results to an upstream controller which may be provided with appropriate additional capabilities.

In the present embodiment, the dead load imposed on the weighing device is subtracted from the measured value, but a part or all of the dead load may be balanced by a counter weight attached to the vicinity of the end of the second arm.

The weight sensing means is a load cell in the embodiment utilizing strain gages, however, other weighing devices compatible with the measuring circuit 206A and output control device can also be used.

In the embodiment, the first arm and the second arm are joined at right angles, other configurations compatible with the requirements the shape of contact with the measuring end of the second arm can be used, for example, the angle can be less than 90° or larger than 180°.

Also, the joining between the first arm and the second arm can be other than ball bearing so long as the joint can rotate freely about the fulcrum.

(IV) Vehicle Stopping Device

A first embodiment of the stopper hook assembly which determines the position of the vehicle and stops the vehicle at the target station will be explained with reference to FIGS. 6 to 10; and a second embodiment with reference to FIGS. 11 to 15.

Figure 6:
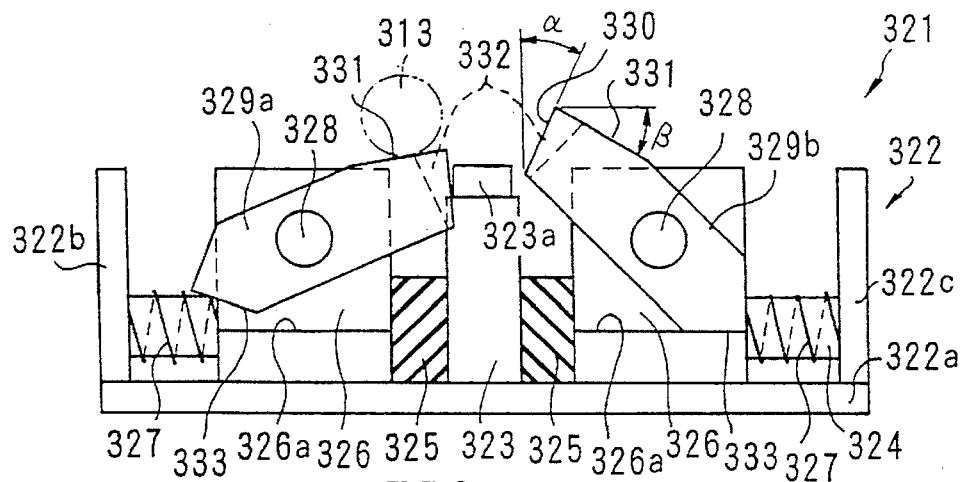
FIG. 6 is a front view of a first embodiment of the stopper hook assembly of the present invention.
Figure 7:
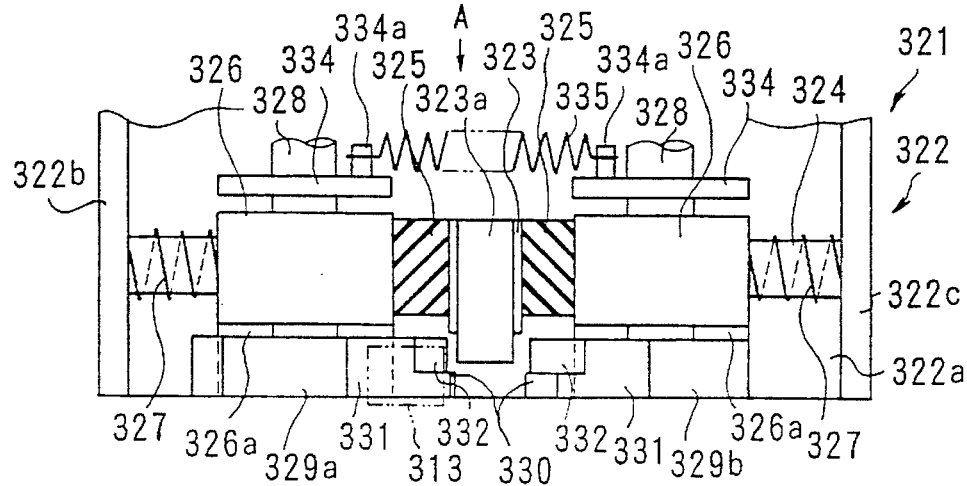
FIG. 7 is a plan view of the device shown in FIG. 6.
Figure 8:
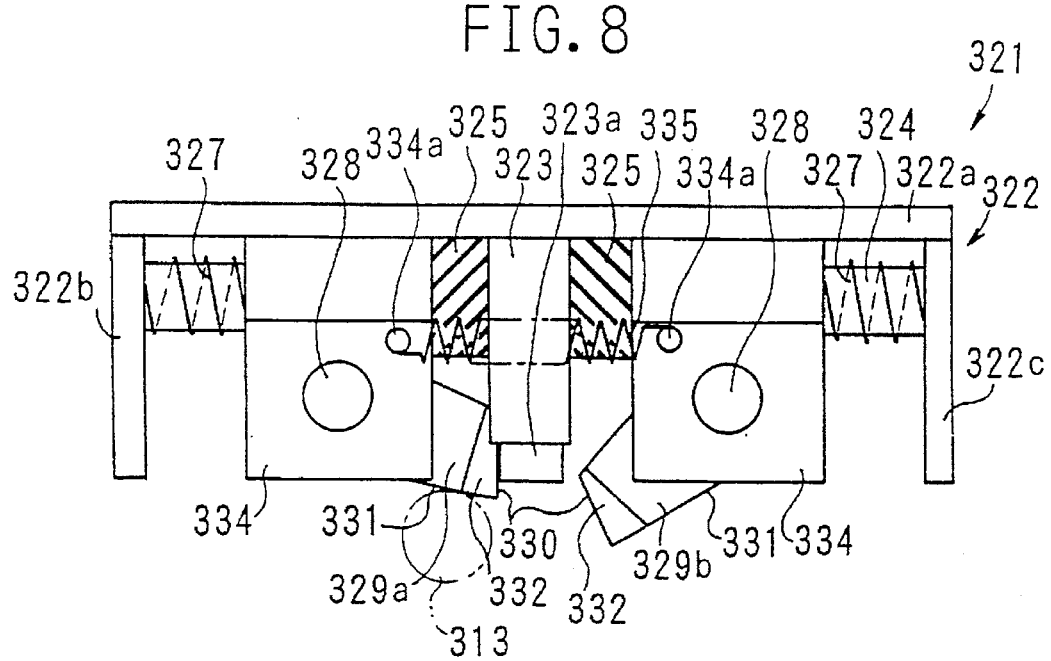
FIG. 8 is a partial view of the device shown in FIG. 6 seen in the direction of arrow A.
Figure 9:
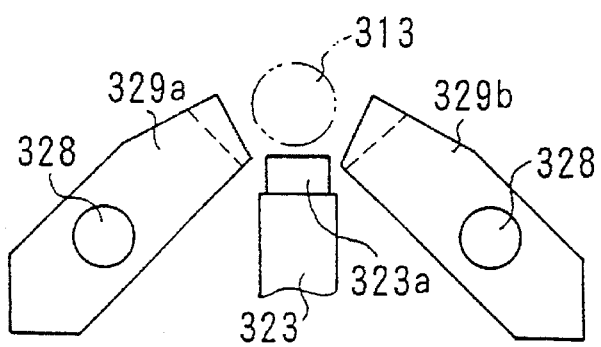
FIG. 9 shows the positions of the stopper pin and the stopper hooks when the vehicle is stationary.
Figure 10:
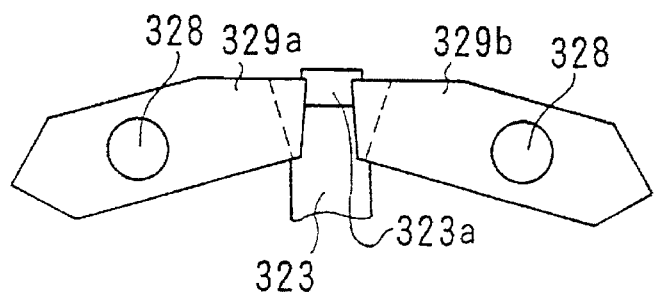
FIG. 10 shows the position of the stopper hooks when the vehicle shown in FIG. 6 does not need to stop.

FIG. 6 shows a front view of the stopper hook assembly of the first embodiment of the present invention; FIGS. 8 and 7 are plan view; FIG. 8 is a view seen in the direction of arrow A in FIG. 7; FIG. 9 shows the positional relationship between the stopper pin and the stopper hook when the vehicle is in the stationary position; and FIG. 10 shows the case when the vehicle does not need to stop at the stopper hook position.

The structure of the assembly 321 will be explained first. FIG. 6 shows a U-shaped frame 322 having a spacer block 323 disposed centrally therein, and a sliding axis 324 through the spacer block 323, attached to the left and right side plates 322b, 322c. Coupled to the sliding axis 324 and on the left and right sides of the spacer block 323, there are disposed rubber spacers 325, slide blocks 326, compression coil springs 327, in sequence starting from the spacer block 323. Hook support axes 328 are rotatably disposed on the left and right slide blocks 326 at right angles to the sliding axis 324; and a left stopper hook 329a, and a right stopper hook 329b are fixed to one end (bottom end in FIG. 7) of the hook support axes 328. The left and right stopper hooks 329a, 329b are symmetrical, and the explanation will be provided only for the right stopper hook 329b. In FIG. 6, the impact surface 330 for the stopper pin 313, which is fixed to the carrier and opens upwards, is oriented at an angle α (where α≦45°) to vertical. The press-down surface 331 for the stopper pin 313, which moves from right to left in FIG. 6, is oriented at an angle β (β=30°) to horizontal, and opens downward.

The stopper hooks 329a, 329b are shaped at the kip end (near the intersection of the impact surfaces 330 and 331) by providing a cutout portion 332 so as to avoid mechanical interference with the proximity switch 323 disposed on top of the spacer block 323. Further, the press-down surface 331 and the opposite slanted surface 333 of the stopper hooks contact with the step portion of the slide block 326.

Each of the opposite ends of the hook support axes 328 (top in FIG. 7) is connected to a driving power source such as a small motor. As shown in FIGS. 8 and 9, left and right rotation discs 334 are fixed near the slide blocks 326, and the discs 334 are pulled by the tension coil spring 335 via pins 334a, and receive torque forces to turn the left stopper hook 329a counter clockwise and the right stopper hook 329b clockwise.

Next, the operation of the assembly 321 will be explained with reference to FIGS. 9 to 11.

Initially, when a vehicle is approaching a station, both stopper hooks 329a, 329b are in the position shown in FIG. 9. When the stopper pin 313 fixed on the carrier moves from left to right in FIG. 6, stopper pin 313 presses down on the press-down surface 331 of the left stopper hook 329a, and the left stopper hook 329a rotates clockwise against the spring force of the coil spring 335, and the stopper pin 313 stops against the impact surface 330 of the right stopper hook 329b.

In this case, the right stopper hook 329b receives a clockwise torque, but because the angle α of the impact surface 330 is less than 45° and the slanted surface 333 is adjacent to the step portion 326a of the slide block 326, the right stopper hook 329b is not rotated. Instead it moves the slide block 326 slightly to the right against the spring force of the coil spring 327 but is immediately pushed back by the coil spring 327. The impact forces and noises generated by this action is absorbed by the rubber spacer 325.

When the vehicle is leaving the station, the right stopper hook 329b is driven by a power source (not shown) through the hook support axis 328 in the counter-clockwise direction to assume a position as shown in FIG. 10, and releases the locking of stopper pin 313.

When it is not necessary for the vehicle to stop at the position of the assembly 321, the left and right stopper hooks 329a, 329b are held in approximately the horizontal position as shown in FIG. 10 by the power source (not shown).

The same sequence of events take place as above when the vehicle approaches a station from the right of the station.

The proximity switch 323a attached to the spacer block 323 performs the role of forwarding the signal to a control unit, for example, to indicate that the vehicle is in the stationary position within the station.

Figure 11:
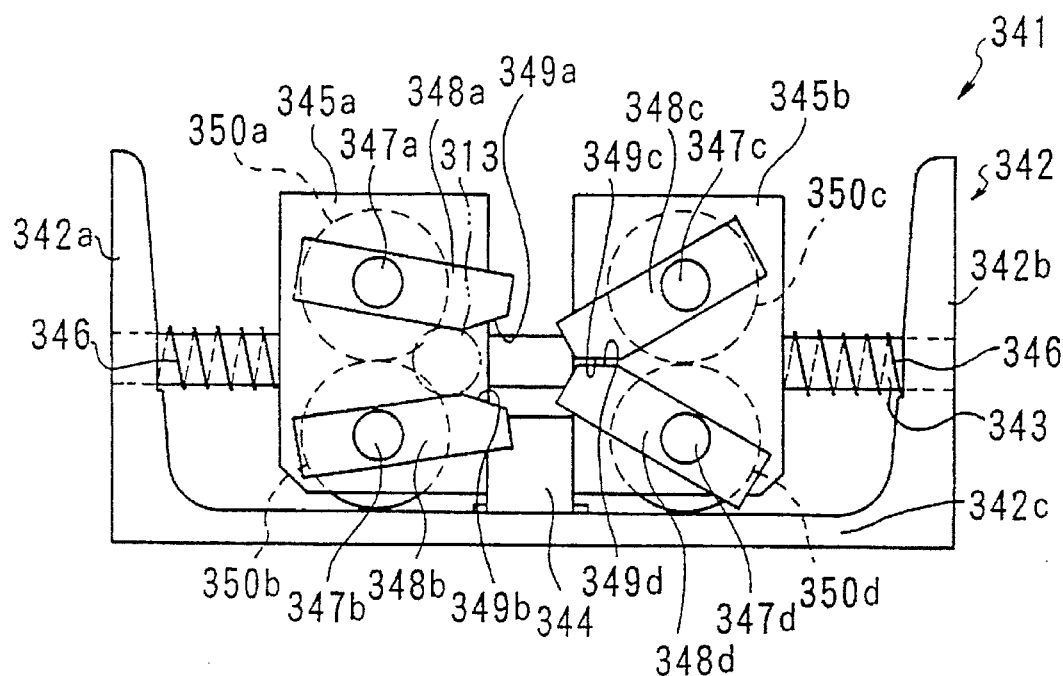
FIG. 11 is a front view of the stopper hook assembly of the present invention.
Figure 12:
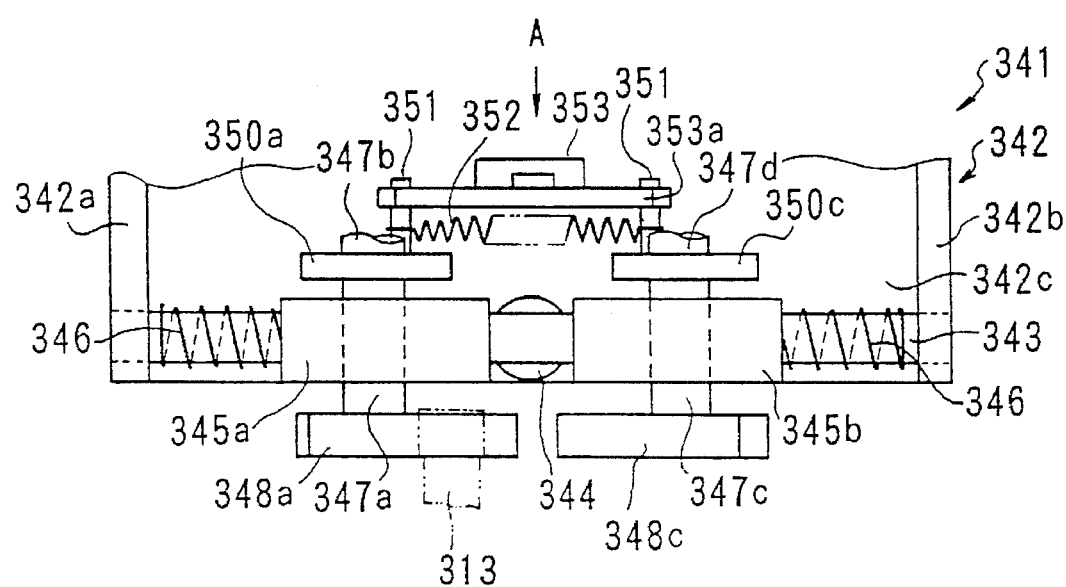
FIG. 12 is a plan view of the device shown in FIG. 11.
Figure 13:
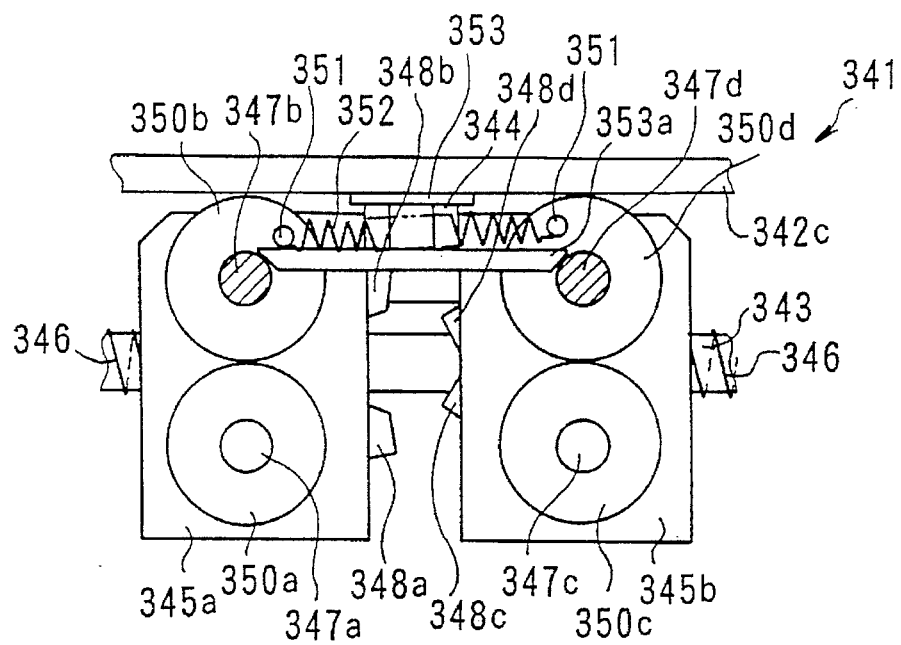
FIG. 13 is a view of the device shown in FIG. 12 seen in the direction of arrow A.
Figure 15:
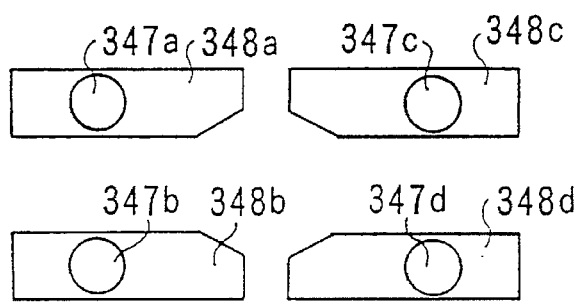
FIG. 15 shows the positions of the stopper pin and the stopper hooks shown in FIG. 11 when the vehicle does not need to stop.

FIG. 11 shows a front view of a second embodiment of the carrier position detection assembly of the present invention. It illustrates a case of a stopper pin approaching from the left, and is in the middle of the stopper hooks. FIG. 12 is a plan view of the assembly shown in FIG. 11; FIG. 13 is a view seen in the direction of arrow A in FIG. 12; FIG. 13 shows the relationship between the stopper pin and the stopper hooks when the vehicle shown in FIG. 11 is stationary; and FIG. 15 shows a case when the vehicle shown in FIG. 11 does not need to stop at the assembly position.

The structure of this assembly 341 will be explained first.

A channel shaped frame 342 comprises a left and a right side plates, 342a, 342b, between which is fixed a sliding shaft 343; and a bottom plates 342c whose center is fixed with a cylindrical spacer 344. A left and a right slide block 345a, 345b straddle the spacer 344, and are slidingly engaged with the sliding axis 343, and are pressed against the spacer 344 by the compression coils 346. The left and right slide blocks 345a, 345b are provided with a pair of hook support axes 347a, 347b, and 347c, 347d, respectively, extending in the horizontal direction in a plane vertical to the sliding axis 343, rotatably supported on the sliding axis 343.

Figure 14:
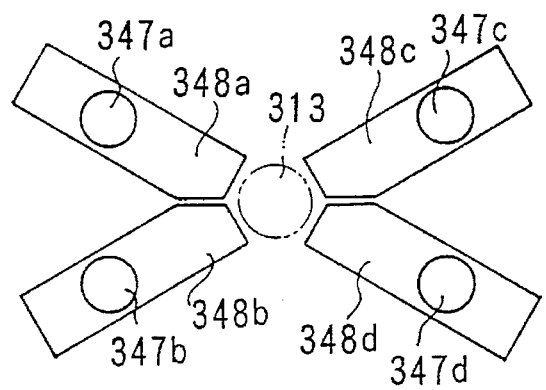
FIG. 14 shows the positions of the stopper pin and the stopper hooks shown in FIG. 11 when the vehicle is stationary.

One end of the hook support axes 347a–349d (bottom in FIG. 12) is fixed with stopper hooks 348a–348d of a square rod shape having cutout portions 349a–349d on one end thereof. The back side of the slide block 345a, 345b is provided with gears 350a–350d in which the gear 350a engages with gear 350b, and the gear 350c engages with the gear 350d. The hook support axes 347b, 347d extend to the back (top in FIG. 12), and is connected to respective power source such as a small motor (not shown). As shown in FIGS. 13 and 14, the gears 350b receives a torque to rotate the stopper hook 348b in the clockwise direction (refer to FIG. 11) by the tension coil spring 352 fixed to the pin 351, and similarly the gear 350d receives a torque to rotate the stopper hook 348d in the counter clockwise direction. The rotation of the stopper hooks 348b, 348d by the toque is stopped by the engagement of the stop bar 353a with the pin 351 of the stopping device 353 bolted to the bottom plate 342c of the frame 342.

The operation of the assembly 341 will be explained.

When a vehicle is approaching a station from left to right, the stopper pin 313 moves from left to right in FIG. 11, and the stopper hook 348a, 348b are spread out against the force of the tension coil spring 352. The stopper pin 313 stops by impacting the stopper hooks 348c, 348d, and the stopper hooks 348a, 348b are closed and restrained by the tension coil spring 352, as shown in FIG. 14. The slide block 345b is moved slightly to the right by the stopper hooks 348c, 348d through the hook support axes 347c, 347d, but the compression coil spring 346 returns the slide block 345b to the original position.

Next, when the vehicle begins moving, the hook support axis 347d is rotated counter clockwise by a power source such as a small motor (not shown), the stopper hooks 348c, 348d open by rotating in opposite directions, respectively, through the gear 350d, 350c and the hook support axis 347c.

When it is not necessary for the vehicle to stop at the assembly 341, both sets of stopper hooks, 348a, 348b and the stopper 348c, 348d remain in the open position, as shown in FIG. 15.

The same sequence of events take place when the vehicle is moving from right to left.

(V) Vehicle position detection device

An embodiment of the vehicle position detection device of the present invention will be explained with reference to FIGS. 16 and 17.

Figure 16:
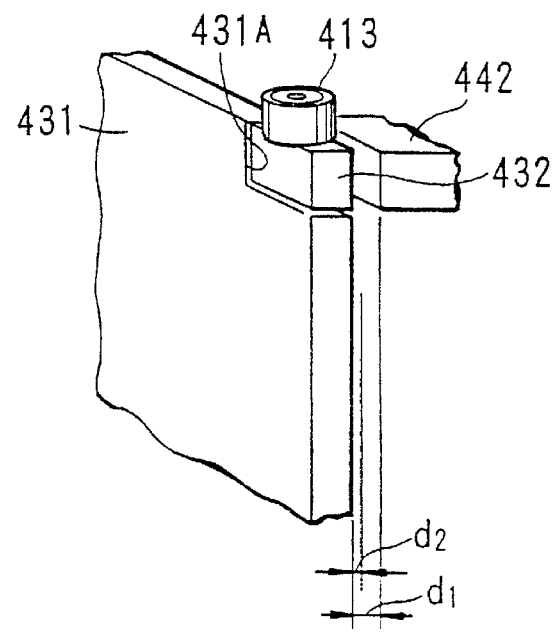
FIG. 16 is a partial perspective view, in which the container has been removed from the transport vehicle, of an embodiment of the vehicle position detection device of the present invention.
Figure 17:
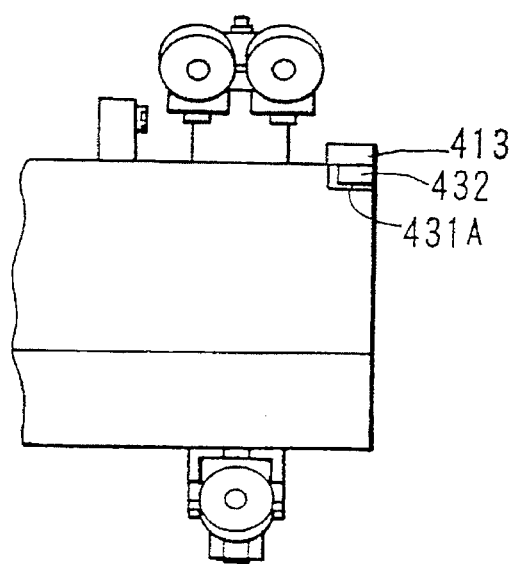
FIG. 17 is a side view of the device shown in FIG. 16 seen from the immobile side of the transport system of the present invention.

The reference numeral 431 in FIGS. 16 and 17 refers to the secondary conductor member made of an electrically conductive material such as an aluminum plate. One corner of the secondary plate 431 has been removed to provided a cutout portion 431A of a given size, and this space is used to mount a striker 432 to act as the position detection device which will be explained.

The surface of the striker 432 is made colinear with the secondary conductor member 431 such that the striker 432 will not protrude beyond the surface of the secondary conductor member 431. Therefore, the primary windings 422 disposed opposite to the surface of the secondary conductor member 431 is able to generate the driving power on the secondary conductor member 431 without interfering with the striker 432.

In FIG. 16, the reference numeral 442 refers to a proximity switch acting as the vehicle position detection device by detecting the position of the striker 432. The proximity switch 442 is disposed on the stopper hook assembly shown in FIG. 6, for example, in such a way that when the transport vehicle is mechanically stopped in place at the target station, the proximity switch 442 detects the presence of the striker 432.

FIG. 17 shows the arrangement of the striker 432 in relation to the secondary conductor member 431 and a stopper pin 413. The stopper pin 413 is the same pin as the stopper pin 313 shown in FIGS. 6 to 14 with respect to the stopper hook assembly 321. The stopper pin 413 is placed opposite to the the striker 432 functioning with the proximity switch 442. The proximity switch 442 is the same as the proximity switch 323a disposed on the stopper hook assembly 321.

The transport vehicle is stopped by the action of the stopper pin 413 engaging with the stopper hook assembly 321, and this event is detected by the proximity switch 442. The signal detected by the vehicle position detection device is outputted to the control section 9 (refer to the system configuration shown in FIG. 33), the control section 9 turns off the power to the primary drive unit (to be described later) so that the transport power will be electrically shut off. Loading/unloading of the goods is then performed at the target station.

(VI) Primary drive unit structure

Figure 18C:
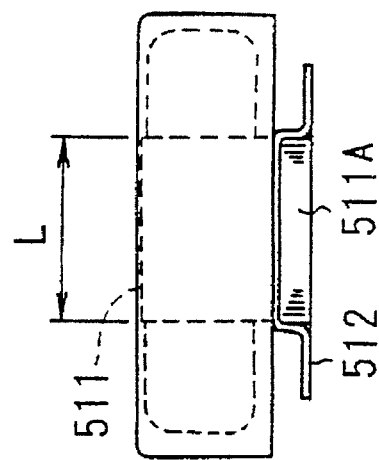
FIG. 18C is a side view of the drive unit.
Figure 18A:
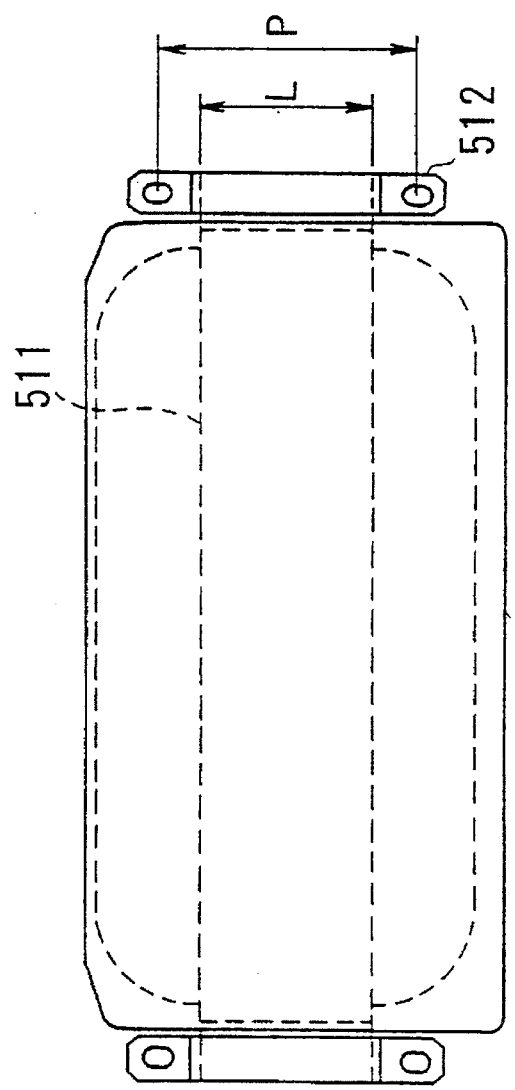
FIG. 18A is a plan view of the primary drive unit of the present invention.
Figure 18B:
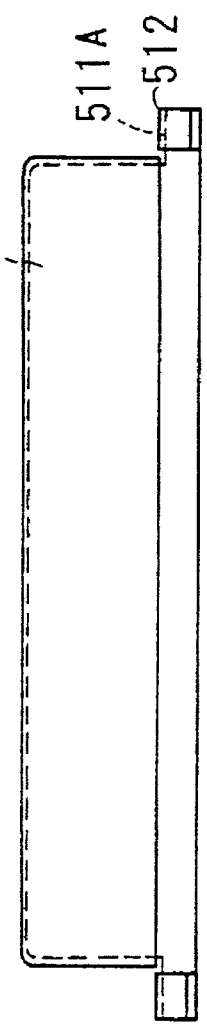
FIG. 18B is a front view of the drive unit.

An embodiment of the primary drive unit structure will be presented with reference to FIGS. 18A to 18C.

FIG. 18A is a plan view; FIG. 18B is a front view of the unit shown in FIG. 18B; and FIG. 18C is a side view of the unit shown in FIG. 18B.

The primary drive unit of the embodiment is made by punching out a plurality of core sections having a tab portion 511A on both bottom peripheral ends of the core section, as illustrated in FIG. 18A to 18C, from a this strip material, and laminating the core sections to produce a laminated core member 511 having a thickness L using a jig, and securing the lamination by riveting, welding or automatic bundling process. Attachment metal devices can be welded on both side end surfaces of the laminated core with the tab portions by such methods as welding, or clamp the tab portion from both ends with press formed attachment metal devices 512.

(VII) Emergency braking device

Figure 19:
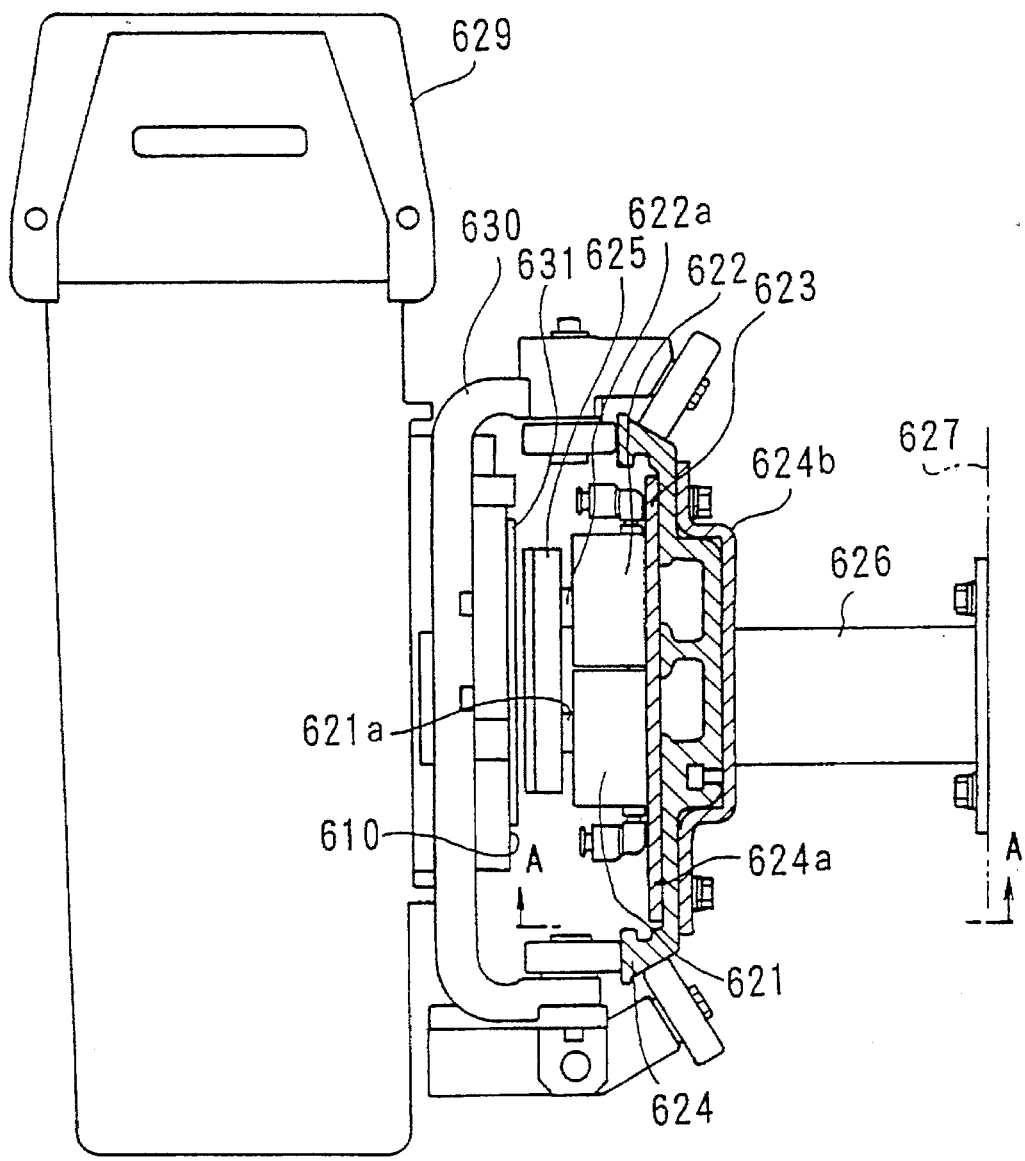
FIG. 19 is a cross sectional view of the transport vehicle including the rail track and the emergency braking device of the present invention.
Figure 20:
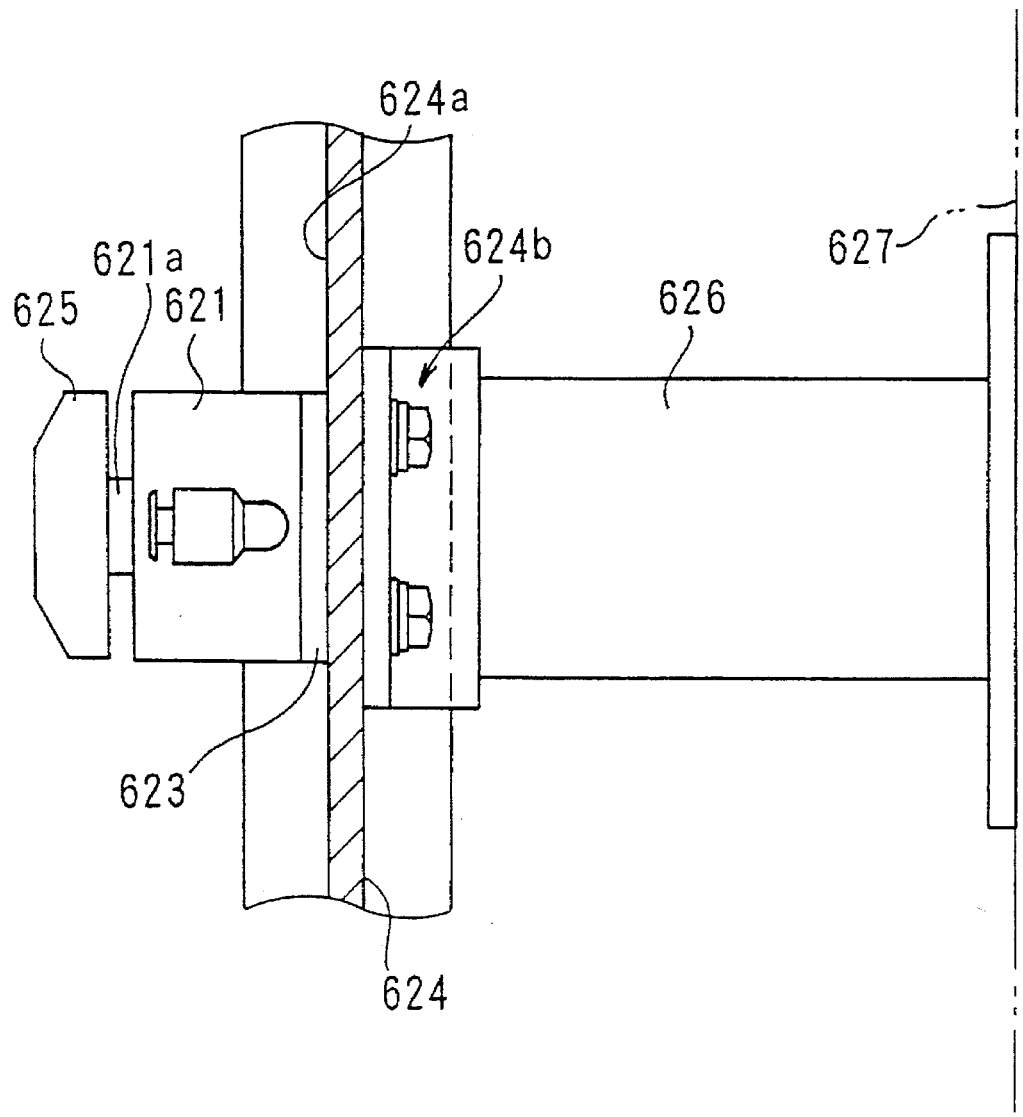
FIG. 20 is a view of the emergency braking device shown in FIG. 19 seen in the direction of arrow A.

An embodiment of the transport system provided with an emergency braking device will be presented with reference to FIGS. 19 and 20.

FIG. 19 is a cross sectional view of the linear transport system; FIG. 20 is a view seen through a section A—A in FIG. 19.

The structure of the emergency braking device will be explained first.

As shown in FIGS. 19 and 20, two small air cylinders operatively connected in series are bolted at right angles to the vertical surface 624a of the rail track 624 with the piston rods 621a, 622a at right angles to the vertical surface 624a through a base plate 623. At the tip end of the piston rods 621a, 622a, there is fixed a brake shoe 625 by means of bolts, thereby connecting the piston rods 621a, 622a in series.

As shown in FIGS. 19 and 20, the rail track 624 is bolted to the fixation structure 627 through a support portion 626 with the air cylinders 621, 622 in the fixed position.

In the meantime, a secondary conductor member 631 (aluminum plate) is attached opposing the brake shoe 625 to the vertical surface of the carrier 630 having the container 629. The operation of the emergency braking device having the construction presented above will be explained in the following.

When an emergency situation arises, such as a breakdown in the control circuit, compressed air is sent automatically to the air cylinders 621, 622, and the piston rods 621a, 622a extend to the left in FIG. 19, and contact and press on the secondary conductor member 631 of the carrier 630, and the carrier 630 is stopped by the resulting frictional forces.

In this case, the air cylinders 621, 622 are attached to the rail track 624 through the portion 624b which is firmly bolted to the fixation structure 627, therefore, the brake shoe 625 is able to effectively generate frictional forces without introducing strains to the rail track 624 by pressing on the secondary conductor member 630. Further, the brake shoe 625 is bolted to two piston rods 621a, 622a, thereby preventing its rotation with respect to the piston rods 621a, 622a and the loosening of the bolts.

(VIII) Linear Motor Unit

Embodiments of the linear motor driven transport system and a linear motor unit of the present invention will be presented with reference to FIGS. 21A, 21B, 22A, 22B, 22A and 22B.

FIG. 21A, 21B show a first embodiment where FIG. 21A is a partial side view; and FIG. 21B is a bottom view.

FIG. 22A, 22B show a second embodiment where FIG. 22A is a partial side view; and FIG. 22B is a bottom view.

Figure 23B:
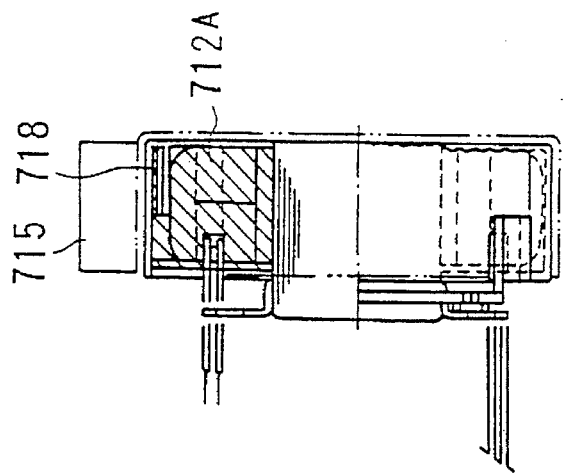
FIG. 23B is a side view of the primary drive unit shown in FIG. 23A.
Figure 23A:
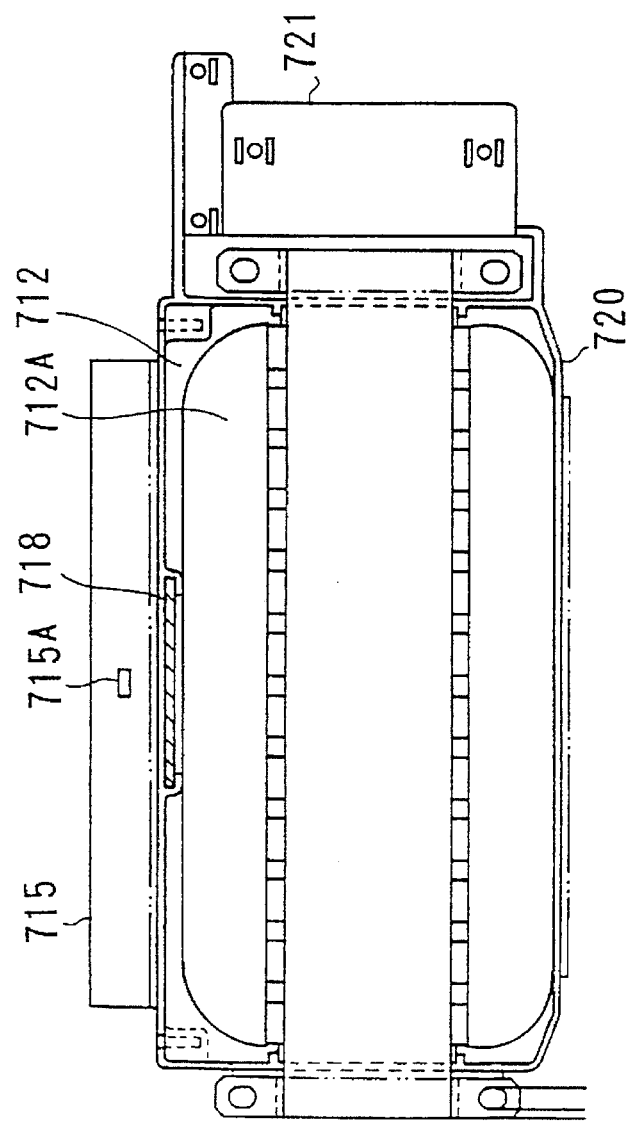
FIG. 23A is a front view a third embodiment of the primary drive unit of the present invention.

FIG. 23A, 23B show a third embodiment where FIG. 23A is a front view; FIG. 23B is a side view.

The first and second embodiments will be explained first.

In the first embodiment shown in FIGS. 21A and 21B, the primary units 712 are attached to the rail track 711, and on the same side of the rail track 711, there are disposed a solid state relay 714, a speed sensor 715, terminal blocks 713 and the position detection device 716.

In the second embodiment shown in FIGS. 22A and 22B also, the primary units 712 are disposed on the rail track 711, as in the first embodiment, and a solid state relay 714, a speed sensor 715, terminal blocks 713 and an emergency braking device 717 are provided on the same side.

The linear motor system shown in these figures is provided with a linear motor unit presented in the third embodiment.

The linear motor unit shown in FIGS. 23A and 23B comprises: primary windings 712A of the primary unit 712; a plastic box 720 for housing the primary windings 712A; a solid state relay 714 disposed on the box 720; a speed sensor 715; terminal blocks 713; and attachment block 721 for attaching the terminal blocks and other devices to control the movement of the linear motor.

Further in the linear motor unit of the third embodiment, to prevent malfunctioning of the speed sensor 715 having a sensor element 715A which may be susceptible to the magnetic field generated by the primary windings 712A because of integration with the motor unit the primary windings 712A and the speed sensor 715 are magnetically shielded by molding a shielding plate 718 within the plastic box 720.

(IX) Container structure

Figure 24B:
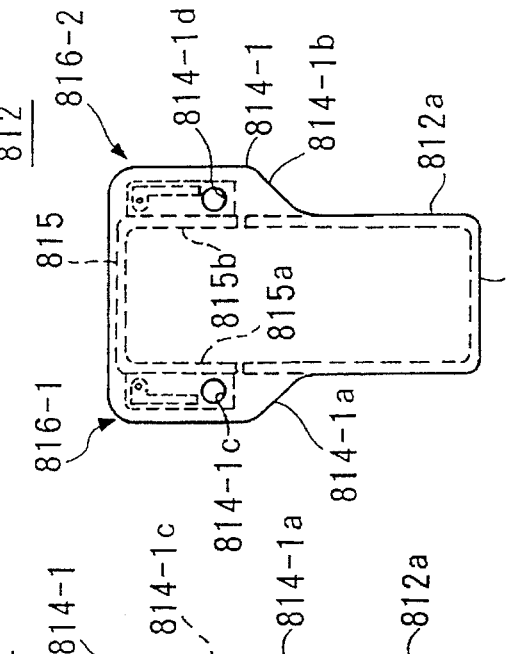
FIG. 24B is a view seen in the direction of the transport of the container shown in FIG. 24A.
Figure 24A:
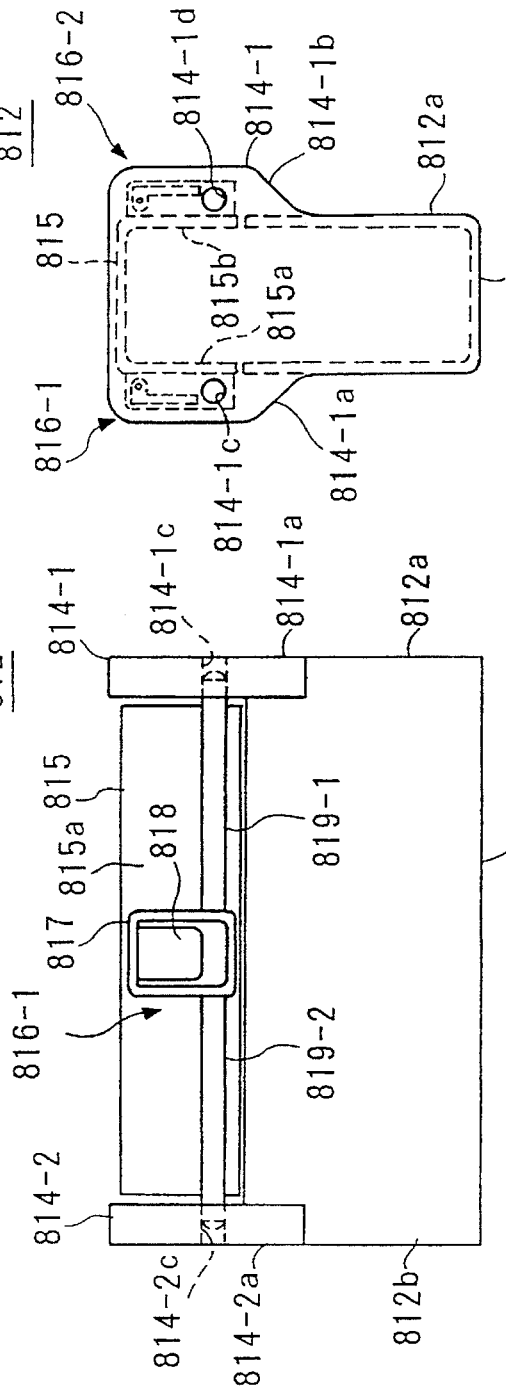
FIG. 24A is a front view of a first embodiment of the container of the present invention.

FIGS. 24A, 24B show a first embodiment of the container of the transport system of the present invention. FIG. 24A is a left side view; and FIG. 24B is a front view of a container 812. The container 812 comprises a U-shaped box 813 for carrying the goods; brackets 814-1, 814-2 formed integrally with the container box 813 disposed, respectively, on the front wall 812a and the back wall 812b of the container 812; a U-shaped container cover 815 having approximately the same inner diameter as the container box 813; and latching devices 816-1, 816-2 symmetrically disposed on the left wall 815a and the right wall 815b.

The structure of the latching device will be explained, next, however, because the left and right latching devices have the same structure, the following explanation is provided only for the left latching device 816-1.

Figure 25B:
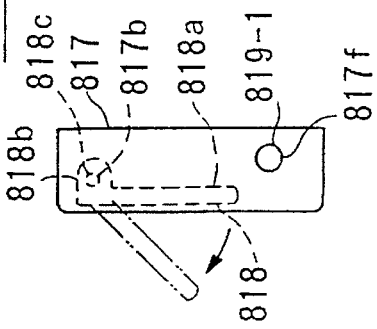
FIG. 25B is a side view seen in the direction of the transport of the container shown in FIG. 25A.
Figure 25A:
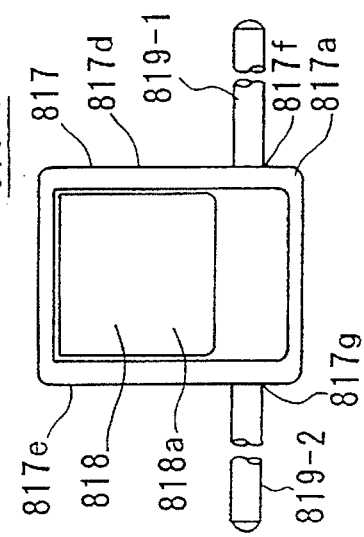
FIG. 25A is a front view of a latching device of the present invention.

FIGS. 25A and 25B show the external appearance of the latching device 816-1, where FIG. 25A is a front view; and FIG. 25B is a right side view. The latching device 816-1 comprises a latching body 817, a lever 818; a pair of latching rods 819-1, 819-2 and an inside mechanism which will be explained later.

The latching body 817 having a frame portion 817a is for attaching to about the middle region of the left wall 815a of the container cover 815, is roughly rectangular in shape, and has a roughly rectangular shaped space of a specific depth.

The lever 818 (refer to FIG. 25B) comprises: a plate shaped operator portion 818a; a cylinder shaped axis member 818b formed integrally with the operator portion 818a; and pins 818c, 818d engaged with each end of the axis member 818b. FIG. 25B shows only the pin 818c. The lever 818 rotates freely in the direction of the arrow in FIG. 25B about the pins 818c, 818d which are inserted loosely into the pin insertion holes 817b, 817c which are formed on the right and left top regions of the frame member 817a of the latching body 817. FIG. 25B shows only the pin insertion hole 817b.

The latching rods 819-1 819-2 are roughly cylindrical, and each end is housed inside the latching body 817. Most of the latching body extends from the through hole 817f, 817g having a diameter slightly larger than that of the latching rods 819-1, 819-2 formed, respectively, on the lower regions of the right wall 817d and the left wall 817e.

The opposite ends of the latching rods 819-1, 819-2 engage with the rod support holes 814-1c, 814-2c when the latching rods 191-1, 819-2 are protruding out most, respectively, from the right wall 817d and the left wall 817e of the latching body 817. The diameters of the rod support holes 814-1c, 814-2c are slightly larger than those of the latching rods 891-1, 819-2, and fit loosely in the rod support holes 814-1c, 814-2c to lock the container cover 815.

The tab section 814-1b, 814-2b of the brackets 814-1 and 814-2 are formed with rod support holes 814-1d, 814-2d which are symmetrically disposed with the rod support holes 814-1c, 814-2c for engaging with a pair of latching rods of the latching device 816-2 for locking the container cover 815. In FIG. 24B, only the rod support hole 814-1d is shown.

Figure 26B:
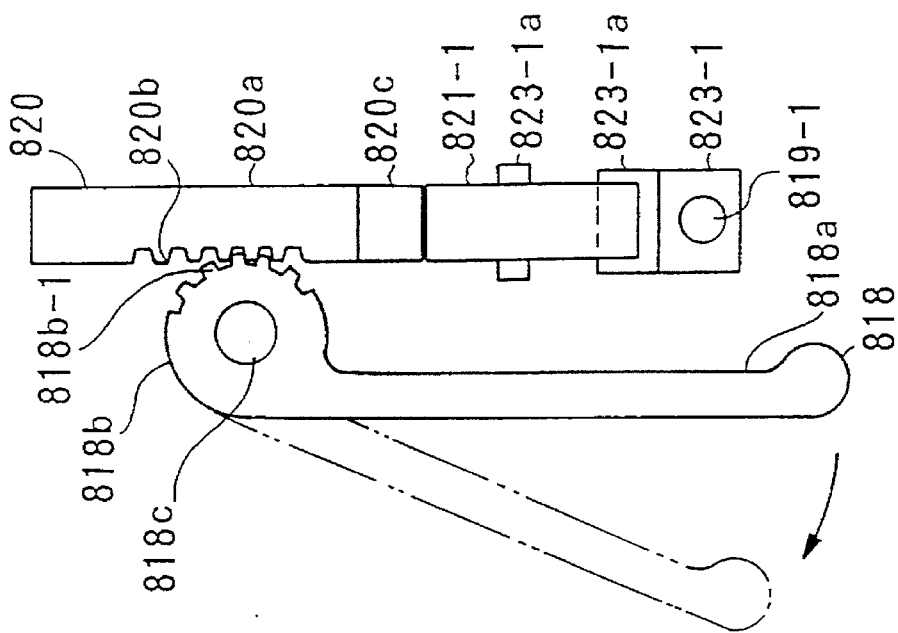
FIG. 26B is a side view of the latching device shown in FIG. 25A.
Figure 26A:
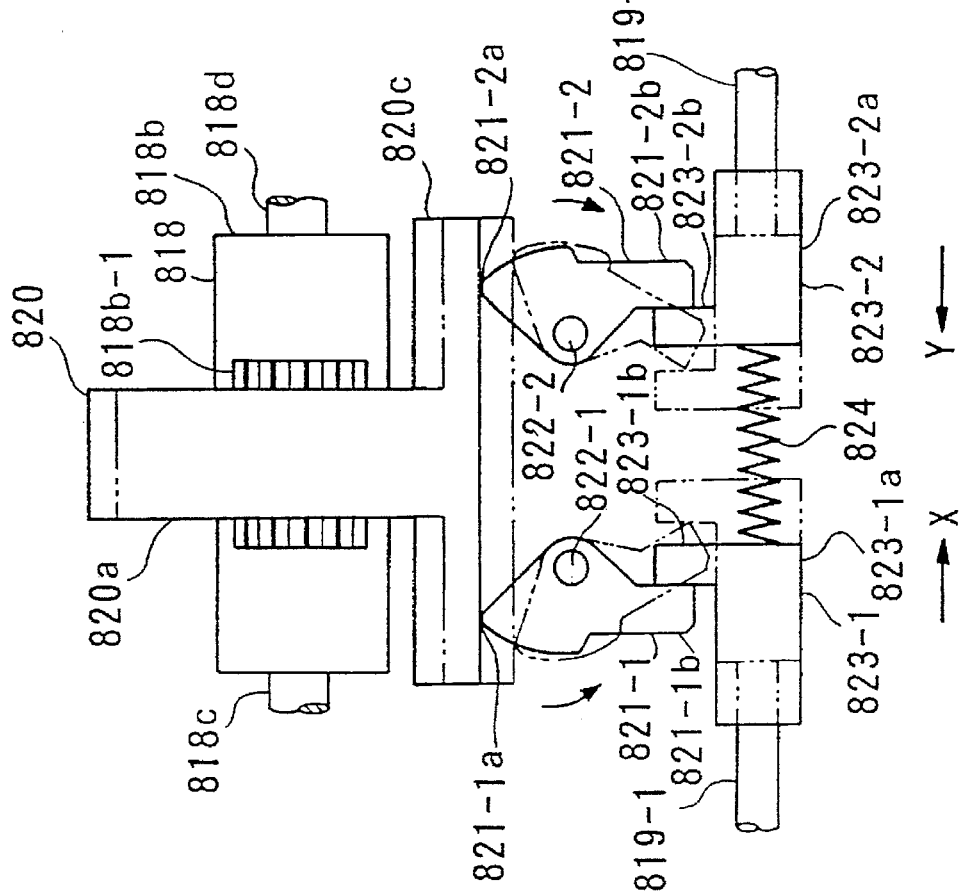
FIG. 26A is a front view of the internal arrangement of the latching device shown in FIG. 25A.

FIGS. 26A and 26B show the internal structure of the latching device 816-1, where FIG. 26A is a partial rear view; and FIG. 26B is a right side view. In FIGS. 26A and 26B, those parts which are the same as those in FIG. 25A, 25B are given the same reference number and their explanations are omitted. Around the periphery of the axis member 818b of the lever 818, a gear portion 818b1 is formed, and the gear portion 818b engages with the gear portion 820b of a T-shaped rack member 820 which is disposed inside the latching body 817 so as to be freely movable in the vertical direction. When the operator portion 818a of the lever 818 is rotated in the arrow direction shown in FIG. 26B so that the operator portion 818a is raised to a position shown by a double dot line in this figure, the rack 820 descends to the position shown by a double dot line shown in FIG. 26A.

Below the rack member 820, a pair of can members 821-1, 821-2 are freely rotatably attached to a pair of cam shafts 822-1, 822-2. The tip portions 821-1a, 821-2a of the can members 821-1, 821-2 are in contact with the beam portion 820c of the rack member 820 when the rack member 820 is in the position shown by a solid line in FIG. 26A.

With reference to FIG. 26A, as the rack member 820 descends by the activation of the operator portion 818a of the lever 818, the tip portions 821-1a, 821-2a are pressed down by the beam portion 820c, resulting in the cam member 821-1 rotate counter clockwise to half way about the cam shaft 822-1, and the cam member 821-2 rotate clockwise to half way about the cam shaft 822-2. The result is that the rack member 820 descends to the position shown by the double dot line, and the cam member 821-1, 921-2 rotate to the positions shown by the respective double dot lines.

Each end portion of the latch rods 819-1, 819-2 is engaged with the rod holders 823-1, 823-2. The cross sections of the rod holders 823-1, 823-2 are roughly L-shaped, and the rod holder 823-1, 823-2 comprise holder bodies 823-1a, 823-2a, and flat arm portions 823-1b, 823-2b. Between the holder bodies 823-1a, 823-2a, there is attached a compression spring 824 which forces the latching rods 819-1, 819-2 to separate from each other. When the operator portion 818a of the lever 818 is unactivated, i.e. remaining in the position shown by the solid line in FIG. 26A, the spring force of the compression spring 824 maintains the ends of the latching rods 819-1, 819-2 are coupled loosely to the rod support holes 814-1c, 814-2c as shown in FIG. 24A, thereby maintaining the container cover 815 in the locked position.

In this state, the arm portions 823-1b, 823-2b of the rod holders 823-1, 823-2 are pressed against the cam members 821-1, 821-2, by virtue of the spring force of the compression spring 824, to rotate clockwise or counter clockwise, until the tip portions 821-1a, 821-2a contact with the beam portion 820c of the rack member 820.

When the operator portion 818a of the lever 818 is activated, the rack member 820 descends, and the tip portions 821-1a, 821-2a of the cam members 821-1, 821-2 are pressed by the beam portion 820c of the rack member 820. The arm portions 823-1b, 823-2b of the rod holders 823-1, 823-2 are pressed towards the X-direction and Y-direction shown in FIG. 26A, respectively, by the tip potions 821-1b, 821-2b. The result is that the latching rods 819-1, 819-2, respectively, slide towards the X- and Y-directions. When the cam members 821-1, 821-2 rotate to the positions shown by the double dot line in FIG. 26A, the latching rods 819-1, 819-2 moves to the respective positions shown by the double dot lines, and are pulled out of the rod support holes 814-1c, 814-2c, thereby unlocking the container cover 815.

Figure 46:
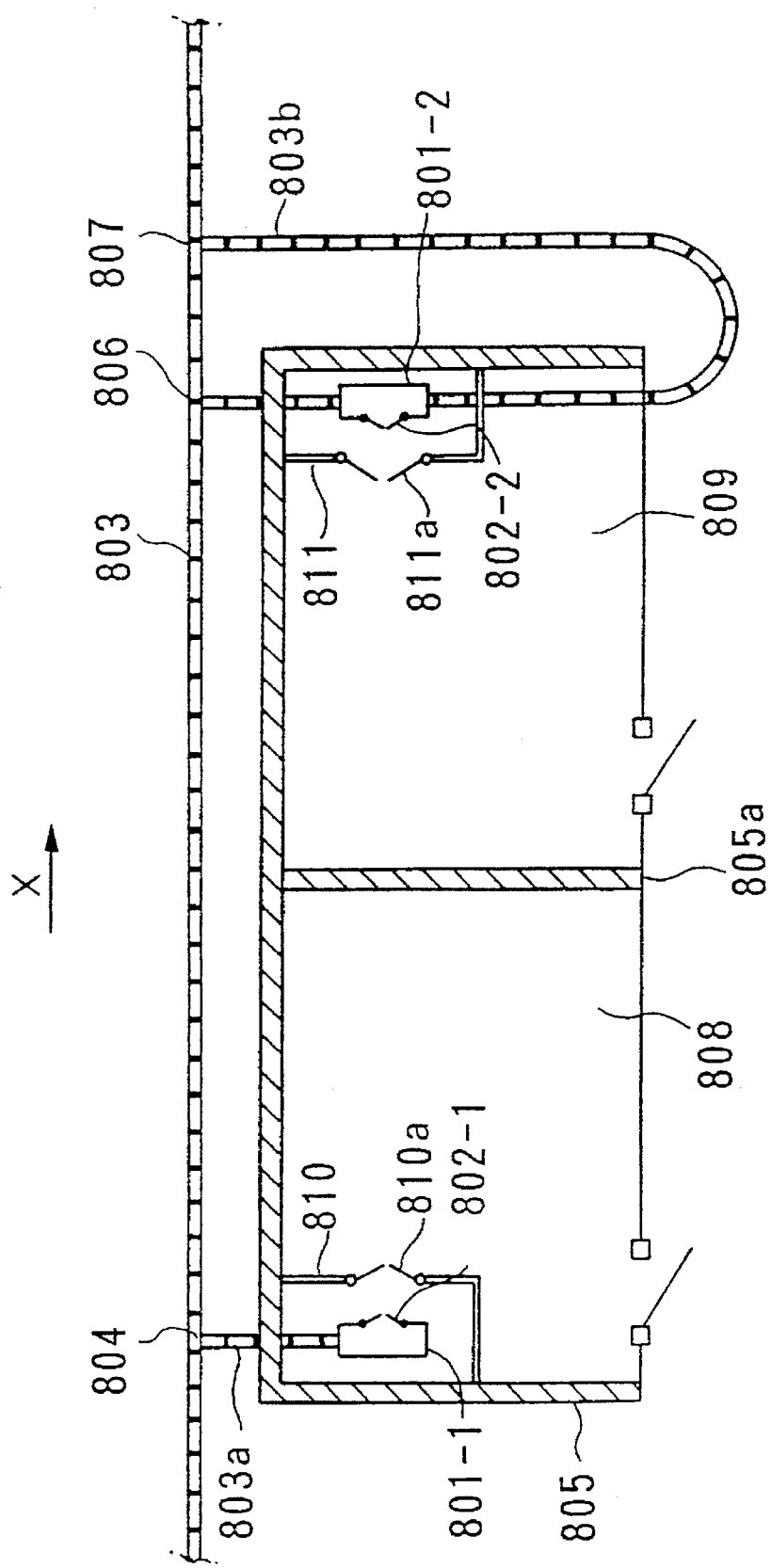
FIG. 46 is an illustration of a track routing using the container configuration of the conventional transport system.

FIG. 27 shows a schematic plan view of a transport system using the container 812 presented above. The parts which are the same as those shown in FIG. 46 are referred to by the same reference numbers, and their explanations are omitted. In FIG. 27, instead of the looped route 803b, a new straight branching route 803c, resembling the branching route 803a, is newly provided. The reference numerals 812-1, 812-2 refer to the containers disposed on the respective stations 810, 811.

The container 812-1 in this type of linear motor driven transport system is transported on the primary route 803 in the X-direction in FIG. 27, and passes through the branching point 804 and the branching route 803a, and arrives and stops at the station 810 having a storage space 808. The operator opens the door 810a of the stations 810, and enters within the station 810, and raises the operator member 818a of the lever 818 of the latching device 816-2 provided on the container 812-1 to the position shown by the double dot line.

By so doing, the rack member 820 is lowered to the position shown in FIG. 26A, and following the decent of the rack member 820, the tip portions 821-1a, 821-2a of the cam members 821-1, 821-2 are pressed by the beam portion 820c of the rack member 820, and the cam member 821-1 rotates in the counter clockwise direction about the cam shaft 822-1, and the cam member 821-2 rotates in the clockwise direction about the cam shaft 822-2 to move to to the respective positions shown in FIG. 26A.

At the same time, the arm portions 823-1b, 823-2b of the rod holders 823-1, 823-2 are pressed, respectively, by the tip portion 821-1b, 821-2b of the cam members 821-1, 821-2 to the X-and Y-directions shown in FIG. 26A, resulting in the latching rods sliding towards the X- and Y-directions to move to the position shown in FIG. 26A. This results in the latching rods 819-1, 819-2 to be pulled out of the rod support holes 814-1d, 814-2d formed in the tab sections 814-1b, 814-2b of the bracket members 814-1, 814-2, thereby the container cover 815 becomes unlocked.

Figure 28:
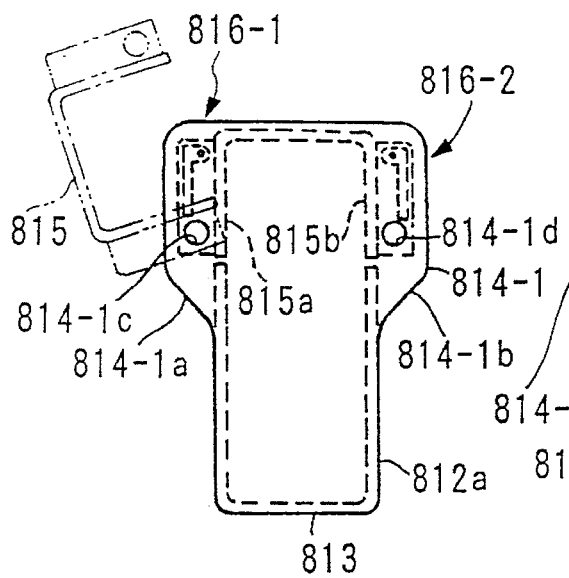
FIG. 28 is a view seen in the direction of transport of the container with its container cover open to the left side.

Next, the operator further moves the operator member 818a of the lever 818 in the direction of the arrow shown in FIG. 26B, then the container cover 815 rotates forward in the operator direction, by rotating about the latching rods 819-1, 819-2 of the latching device 816-1 and pivoting about the rod support holes 814-1c, 814-2c, formed on the tab portion 814-1a, 814-2a of the bracket member 814-1, 814-2, as the fulcrum as illustrated in FIG. 28. The operator then performs loading or unloading of the goods from the container 812-1.

In the meantime, the container 812-2 shown in FIG. 27 is transported on the main track 803 in the X-direction in FIG. 27, and after passing the branching point 806 and the branching track 803c, it is transported into the warehouse 805, and stops at the station 811 of the storage space 809. At this time, the operator enters the station 811 by opening the door 811a of the station 11, and operates the operator member 818a of the lever 818, of the latching device 816-1 provided on the container 812-2, in the direction of the arrow shown in FIG. 26B to raise the lever 818 to the position shown in this figure.

By so doing, the latching rods 819-1, 819-2, respectively, move in the X- and Y-directions shown in FIG. 26A, and moves to the positions shown in the figure, the latching rods 819-1, 819-2 are pulled out of the support holes 814-1c, 814-2c formed on the tab portions 814-1a, 814-2a of the bracket member 814-1, 814-2, thereby the container cover 815 becomes unlocked.

Figure 29:
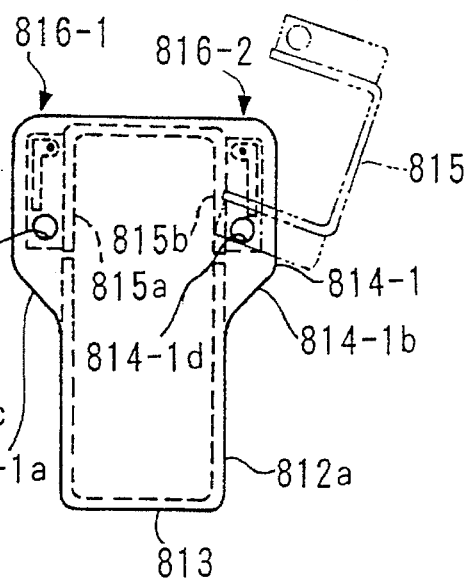
FIG. 29 is a view seen in the direction of transport of the container with its container cover open to the right side.

Next, the operator further moves the operator member 818a of the lever 818 in the direction of the arrow shown in FIG. 26B, then the container cover 815 rotates forward in the operator direction, by rotating about the latching rods 819-1, 819-2 of the latching device 816-2 and pivoting about the rod support holes 814-1b, 814-2b formed on the tab portions 814-1b, 814-2b formed on the bracket members 814-1, 814-2 as the fulcrum as illustrated in FIG. 29. The operator then performs loading or unloading of the goods from the container 812-2.

when the container 812-1, 812-2 are to be inspected or the inside of the container box 813 to be cleaned, the operator activates the operator member 818a of the lever 818 for both latching devices 816-1, 816-2 simultaneously, thereby pulling out the latching rods 819-1, 819-2 from the rod support holes 814-1c, 814-2c, 814-1d and 814-2d, formed on the tab portions 814-1a, 814-2a, 814-1b and 814-2b of the bracket members 814-1, 814-2, thereby placing both left and right container covers 815 in the unlocked position, then removes the container cover 815 from the top of the container box 813.

As presented above, various embodiments of the container configuration of the present invention were explained with reference to the drawings, practical configurations are not bound by these embodiments, and includes other configurations within the scope of the concept disclosed.

Figure 30:
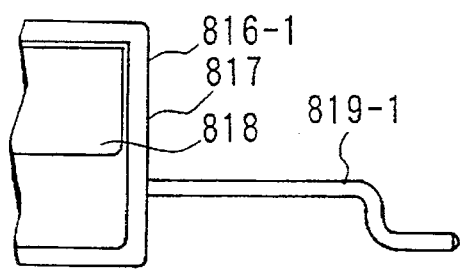
FIG. 30 is a variation of the latching rod of the present invention.
Figure 31:
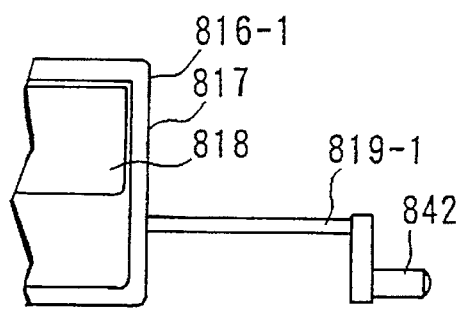
FIG. 31 is an example of attaching a metal handle to the latching rod.
Figure 32:
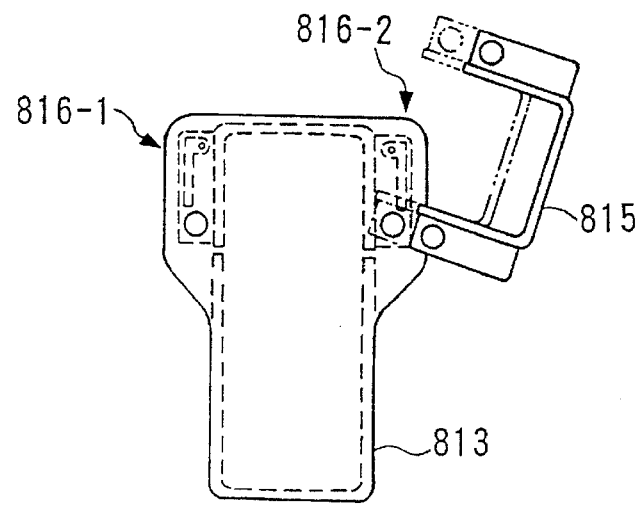
FIG. 32 shows the container cover having either the latching rod or the handle being opened to the right side.

For example, in one of the embodiments presented, latching rods 819-1, 819-2 are shown to be a rod shape from one end to the other end thereof. However, as shown in FIG. 30, the ends of the latching rods 819-1, 819-2 may be bent in an L-shape, or as shown in FIG. 31, the end may be coupled to an L-shaped metal handle 842. With such arrangements, the opening of the container cover 815 can be enlarged as illustrated in FIG. 32, thus facilitating loading and unloading of the goods. Such an arrangement also makes it possible to inspect the containers 812-1, 812-2 or clean the container box 813 without removing the container cover 815.

What is claimed is:

1. An emergency braking device for a linear motor driven transport system which drives a transport vehicle along a track rail by a linear motor system comprising a transport vehicle-based secondary conductor and a plurality of ground-based primary drive units having iron cores and coils wrapped about said iron cores, said device comprising:

an actuator attached to a vertical surface of the track rail; and a brake shoe attached to said actuator for opposing said transport vehicle-based secondary conductor, motion of the transport vehicle being retarded and stopped by frictional resistance generated upon said brake shoe being brought into contact with said transport vehicle-based secondary conductor by operating said actuator.

2. An emergency brake device in accordance with claim 1, wherein said actuator is attached to a track rail section which is laid vertically in relation to the surface of the ground.

3. An emergency braking device for a linear motor driven transport system which drives a transport vehicle along a track rail by a linear motor system comprising a transport vehicle-based secondary conductor and a plurality of ground-based primary drive units having iron cores and coils wrapped about said iron cores, said device comprising:

an actuator attached to a vertical surface of the track rail, said actuator comprising two cylinders each having a rod which extends by means of fluid supplied from a source, said cylinders being arranged perpendicular to the vertical surface of the track rail and attached to a position where said track rail is affixed to a support section which supports said track rail; and a brake shoe attached to said actuator for opposing said transport vehicle-based secondary conductor, said brake shoe being attached to the ends of the rods of said two cylinders, motion of the transport vehicle being retarded and stopped by frictional resistance generated upon said brake shoe being brought into contact with said transport vehicle-based secondary conductor by operating said actuator.

4. An emergency braking device for a linear motor driven transport system in accordance with claim 3, wherein said cylinders are air cylinders and the fluid supplied from the source is compressed air.

5. An emergency brake device in accordance with claim 3, wherein said cylinder is attached to a track rail section which is laid vertically in relation to the surface of the ground.

6. An emergency brake device in accordance with claim 4, wherein said cylinder is attached to a track rail section which is laid vertically in relation to the surface of the ground.

* * * * *